(12) United States Patent
Jin et al.

(10) Patent No.: US 11,373,122 B2
(45) Date of Patent: Jun. 28, 2022

(54) FIXED-ROUTE SERVICE SYSTEM FOR CAVH SYSTEMS

(71) Applicant: CAVH LLC, Fitchburg, WI (US)

(72) Inventors: Jing Jin, Basking Ridge, NJ (US); Bin Ran, Fitchburg, WI (US); Tianyi Chen, Madison, WI (US); Tianya Zhang, Madison, WI (US); Xiaowen Jiang, Madison, WI (US); Zhenxing Yao, Madison, WI (US)

(73) Assignee: CAVH LLC, Fitchburg, WI (US)

( * ) Notice: Subject to any disclaimer, the term of this patent is extended or adjusted under 35 U.S.C. 154(b) by 283 days.

(21) Appl. No.: 16/506,470

(22) Filed: Jul. 9, 2019

(65) Prior Publication Data

US 2020/0019894 A1 Jan. 16, 2020

Related U.S. Application Data

(60) Provisional application No. 62/696,177, filed on Jul. 10, 2018.

(51) Int. Cl.
*G08G 1/08* (2006.01)
*G08G 1/01* (2006.01)
(Continued)

(52) U.S. Cl.
CPC ......... *G06Q 10/047* (2013.01); *G05D 1/0088* (2013.01); *G05D 1/0291* (2013.01);
(Continued)

(58) Field of Classification Search
CPC ........ G06Q 10/047; G06Q 10/00; G08G 1/22; G08G 1/0145; G08G 1/0133;
(Continued)

(56) References Cited

U.S. PATENT DOCUMENTS

| 3,824,469 A | 7/1974 | Ristenbatt |
| 4,023,017 A | 5/1977 | Ceseri |
| (Continued) | | |

FOREIGN PATENT DOCUMENTS

| CN | 102768768 B | 11/2012 |
| CN | 103854473 A | 6/2014 |
| (Continued) | | |

OTHER PUBLICATIONS

Al-Najada et al., "Autonomous vehicles safe-optimal trajectory selection based on big data analysis and predefined user preferences," 2016 IEEE 7th Annual Ubiquitous Computing, Electronics & Mobile Communication Conference (UEMCON), New York, NY, 2016, pp. 1-6.
(Continued)

*Primary Examiner* — Yonel Beaulieu
(74) *Attorney, Agent, or Firm* — Casimir Jones, S.C.; Thomas A. Isenbarger

(57) ABSTRACT

This technology describes one type of CAVH services focusing on fixed-route trips such as commuting, shopping, school, and other trips that users previously travel recurrently and frequently. The technology describes the system architecture of the proposed fixed-route services. The technology includes methods of calibrating, providing, and optimizing the functionalities of such fixed-route services. The detailed methods are proposed for pre-trip, enroute, trip chaining, and post-trip operations, the cyber-physical security, and privacy protection for the users and participating vehicles.

23 Claims, 11 Drawing Sheets

(51) Int. Cl.
*G05D 1/00* (2006.01)
*G08G 1/00* (2006.01)
*G06Q 10/04* (2012.01)
*G05D 1/02* (2020.01)
*G08G 1/0967* (2006.01)

(52) U.S. Cl.
CPC ......... *G08G 1/0133* (2013.01); *G08G 1/0145* (2013.01); *G08G 1/096725* (2013.01); *G08G 1/22* (2013.01); *G05D 2201/0213* (2013.01)

(58) Field of Classification Search
CPC .. G08G 1/096725; G08G 1/16; G05D 1/0291; G05D 1/0088; G05D 2201/0213; G05D 1/00

See application file for complete search history.

(56) References Cited

U.S. PATENT DOCUMENTS

| | | | |
|---|---|---|---|
| 4,704,610 A | 11/1987 | Smith et al. | |
| 4,962,457 A | 10/1990 | Chen et al. | |
| 5,420,794 A | 5/1995 | James | |
| 5,504,683 A | 4/1996 | Gurmu | |
| 5,625,559 A | 4/1997 | Egawa | |
| 5,732,785 A | 3/1998 | Ran et al. | |
| 6,028,537 A | 2/2000 | Suman et al. | |
| 6,064,318 A | 5/2000 | Kirchner, III et al. | |
| 6,317,682 B1 | 11/2001 | Ogura et al. | |
| 6,829,531 B2 | 12/2004 | Lee | |
| 6,900,740 B2 | 5/2005 | Bloomquist et al. | |
| 7,295,904 B2 | 11/2007 | Kanevsky et al. | |
| 7,324,893 B2 | 1/2008 | Yamashita et al. | |
| 7,343,243 B2 | 3/2008 | Smith | |
| 7,382,274 B1 | 6/2008 | Kermani et al. | |
| 7,418,346 B2 | 6/2008 | Breed et al. | |
| 7,421,334 B2 | 9/2008 | Dahlgren et al. | |
| 7,425,903 B2 | 9/2008 | Boss et al. | |
| 7,554,435 B2 | 6/2009 | Tengler et al. | |
| 7,725,249 B2 | 5/2010 | Kickbusch | |
| 7,860,639 B2 | 12/2010 | Yang | |
| 7,894,951 B2 | 2/2011 | Norris et al. | |
| 7,979,172 B2 | 7/2011 | Breed | |
| 8,352,112 B2 | 1/2013 | Mudalige | |
| 8,527,139 B1 | 9/2013 | Yousuf | |
| 8,589,070 B2 | 11/2013 | Ban | |
| 8,630,795 B2 | 1/2014 | Breed et al. | |
| 8,682,511 B2 | 3/2014 | Andreasson | |
| 8,972,080 B2 | 3/2015 | Shida et al. | |
| 9,053,636 B2 | 6/2015 | Gordon | |
| 9,076,332 B2 | 7/2015 | Myr | |
| 9,120,485 B1 | 9/2015 | Dolgov | |
| 9,182,951 B1 | 11/2015 | Ormerod et al. | |
| 9,349,055 B1 | 5/2016 | Ogale | |
| 9,494,935 B2 | 11/2016 | Okumura et al. | |
| 9,495,874 B1 | 11/2016 | Zhu et al. | |
| 9,595,190 B2 | 3/2017 | McCrary | |
| 9,646,496 B1 | 5/2017 | Miller et al. | |
| 9,654,511 B1 | 5/2017 | Brocco et al. | |
| 9,665,101 B1 | 5/2017 | Templeton | |
| 9,731,713 B2 | 8/2017 | Horii | |
| 9,799,224 B2 | 10/2017 | Okamoto | |
| 9,845,096 B2 | 12/2017 | Urano et al. | |
| 9,940,840 B1 | 4/2018 | Schubert et al. | |
| 9,964,948 B2 | 5/2018 | Ullrich et al. | |
| 10,074,223 B2 | 9/2018 | Newman | |
| 10,074,273 B2 | 9/2018 | Yokoyama et al. | |
| 10,380,886 B2 | 8/2019 | Ran et al. | |
| 10,692,365 B2 * | 6/2020 | Ran | G08G 1/167 |
| 10,741,063 B2 * | 8/2020 | McConnell | G08G 1/0145 |
| 10,755,579 B2 * | 8/2020 | Klopfenstein | G08G 1/096775 |
| 10,802,477 B1 * | 10/2020 | Konrardy | G08B 21/18 |
| 10,867,512 B2 * | 12/2020 | Ran | B60W 30/165 |
| 10,928,523 B2 * | 2/2021 | Adachi | G01S 19/43 |
| 10,948,304 B2 * | 3/2021 | Kuzmanovic | G08G 5/0052 |
| 10,965,493 B2 * | 3/2021 | Iwata | H04L 12/437 |
| 10,990,103 B2 * | 4/2021 | Rottkamp | G08G 1/096775 |
| 11,032,370 B2 * | 6/2021 | Higuchi | H04L 67/1097 |
| 11,061,396 B2 * | 7/2021 | Siwo | G05D 1/0094 |
| 2002/0008637 A1 | 1/2002 | Lemelson et al. | |
| 2003/0045995 A1 | 3/2003 | Lee | |
| 2004/0145496 A1 | 7/2004 | Ellis | |
| 2004/0230393 A1 | 11/2004 | Tzamaloukas | |
| 2005/0060069 A1 | 3/2005 | Breed et al. | |
| 2005/0102098 A1 | 5/2005 | Montealegre et al. | |
| 2005/0209769 A1 | 9/2005 | Yamashita et al. | |
| 2005/0222760 A1 | 10/2005 | Cabral et al. | |
| 2006/0142933 A1 | 6/2006 | Feng | |
| 2006/0226968 A1 | 10/2006 | Tengler et al. | |
| 2006/0251498 A1 | 11/2006 | Buzzoni et al. | |
| 2007/0085993 A1 * | 4/2007 | Brown | G01C 3/00 356/3 |
| 2007/0093997 A1 | 4/2007 | Yang et al. | |
| 2007/0146162 A1 | 6/2007 | Tengler et al. | |
| 2008/0042815 A1 | 2/2008 | Breed et al. | |
| 2008/0095163 A1 | 4/2008 | Chen et al. | |
| 2008/0150786 A1 | 6/2008 | Breed | |
| 2008/0161986 A1 | 7/2008 | Breed et al. | |
| 2008/0161987 A1 | 7/2008 | Breed | |
| 2008/0275646 A1 | 11/2008 | Perng et al. | |
| 2010/0013629 A1 | 1/2010 | Sznaider et al. | |
| 2010/0256836 A1 | 10/2010 | Mudalige et al. | |
| 2011/0224892 A1 | 9/2011 | Speiser | |
| 2011/0227757 A1 | 9/2011 | Chen et al. | |
| 2012/0017262 A1 | 1/2012 | Kapoor et al. | |
| 2012/0022776 A1 | 1/2012 | Razavilar et al. | |
| 2012/0059574 A1 | 3/2012 | Hada | |
| 2012/0105639 A1 | 5/2012 | Stein et al. | |
| 2012/0283910 A1 | 11/2012 | Lee et al. | |
| 2012/0303807 A1 | 11/2012 | Akelbein et al. | |
| 2013/0116915 A1 | 5/2013 | Ferreira et al. | |
| 2013/0137457 A1 | 5/2013 | Potkonjak | |
| 2013/0138714 A1 | 5/2013 | Ricci | |
| 2013/0141580 A1 | 6/2013 | Stein et al. | |
| 2013/0204484 A1 | 8/2013 | Ricci | |
| 2013/0218412 A1 | 8/2013 | Ricci | |
| 2013/0297140 A1 | 11/2013 | Montemerlo et al. | |
| 2013/0297196 A1 | 11/2013 | Shida | |
| 2014/0112410 A1 | 4/2014 | Yokoyama | |
| 2014/0219505 A1 | 8/2014 | Kindo et al. | |
| 2014/0222322 A1 | 8/2014 | Durekovic | |
| 2014/0278026 A1 | 9/2014 | Taylor | |
| 2014/0278052 A1 | 9/2014 | Slavin et al. | |
| 2014/0354451 A1 | 12/2014 | Tonguz et al. | |
| 2015/0153013 A1 | 6/2015 | Zhao et al. | |
| 2015/0169018 A1 | 6/2015 | Rogo et al. | |
| 2015/0197247 A1 | 7/2015 | Ichinowaka | |
| 2015/0199685 A1 | 7/2015 | Betancourt et al. | |
| 2015/0211868 A1 | 7/2015 | Matsushita et al. | |
| 2015/0310742 A1 | 10/2015 | Albornoz | |
| 2016/0042303 A1 | 2/2016 | Medina et al. | |
| 2016/0086391 A1 | 3/2016 | Ricci | |
| 2016/0110820 A1 | 4/2016 | Fleck et al. | |
| 2016/0132705 A1 | 5/2016 | Kovarik et al. | |
| 2016/0142492 A1 | 5/2016 | Fang et al. | |
| 2016/0148440 A1 | 5/2016 | Kwak | |
| 2016/0216130 A1 | 7/2016 | Abramson et al. | |
| 2016/0221186 A1 | 8/2016 | Perrone | |
| 2016/0231746 A1 | 8/2016 | Hazelton et al. | |
| 2016/0238703 A1 | 8/2016 | Liu et al. | |
| 2016/0325753 A1 | 11/2016 | Stein et al. | |
| 2016/0328272 A1 | 11/2016 | Ahmed et al. | |
| 2016/0330036 A1 | 11/2016 | Zhou et al. | |
| 2016/0370194 A1 | 12/2016 | Colijn et al. | |
| 2017/0026893 A1 | 1/2017 | Lagassey | |
| 2017/0039435 A1 | 2/2017 | Ogale et al. | |
| 2017/0046883 A1 | 2/2017 | Gordon et al. | |
| 2017/0053529 A1 | 2/2017 | Yokoyama et al. | |
| 2017/0075195 A1 | 3/2017 | Stein et al. | |
| 2017/0085632 A1 | 3/2017 | Cardote | |
| 2017/0090994 A1 | 3/2017 | Jubinski et al. | |
| 2017/0109644 A1 | 4/2017 | Nariyambut Murali et al. | |
| 2017/0131435 A1 | 5/2017 | Peacock et al. | |
| 2017/0206783 A1 | 7/2017 | Miller | |

(56) References Cited

U.S. PATENT DOCUMENTS

| | | |
|---|---|---|
| 2017/0262790 A1 | 9/2017 | Khasis |
| 2017/0276492 A1 | 9/2017 | Ramasamy |
| 2017/0324817 A1 | 11/2017 | Oliveira et al. |
| 2017/0337571 A1 | 11/2017 | Bansal et al. |
| 2017/0339224 A1 | 11/2017 | Condeixa et al. |
| 2017/0357980 A1 | 12/2017 | Bakun et al. |
| 2018/0018216 A1 | 1/2018 | Halford et al. |
| 2018/0053413 A1 | 2/2018 | Patil e al. |
| 2018/0065637 A1 | 3/2018 | Bassindale |
| 2018/0114079 A1 | 4/2018 | Myers et al. |
| 2018/0151064 A1 | 5/2018 | Xu et al. |
| 2018/0158327 A1 | 6/2018 | Gärtner |
| 2018/0188739 A1* | 7/2018 | Tseng .................. B60W 30/12 |
| 2018/0190116 A1 | 7/2018 | Bauer et al. |
| 2018/0262887 A1 | 9/2018 | Futaki |
| 2018/0299274 A1 | 10/2018 | Moghe et al. |
| 2018/0308344 A1 | 10/2018 | Ravindranath et al. |
| 2018/0328756 A1* | 11/2018 | Forutanpour ...... G01C 21/3476 |
| 2018/0336780 A1 | 11/2018 | Ran et al. |
| 2019/0096238 A1 | 3/2019 | Ran et al. |
| 2019/0244518 A1 | 8/2019 | Yang et al. |
| 2019/0244521 A1 | 8/2019 | Ran et al. |
| 2020/0019894 A1* | 1/2020 | Jin ....................... G05D 1/0291 |

FOREIGN PATENT DOCUMENTS

| | | |
|---|---|---|
| CN | 104485003 B | 4/2015 |
| CN | 106710203 A | 5/2017 |
| CN | 107665578 A | 2/2018 |
| CN | 107807633 A | 3/2018 |
| CN | 108039053 A | 5/2018 |
| CN | 108447291 A | 8/2018 |
| EP | 2395472 A1 | 12/2011 |
| KR | 20170008703 A | 1/2017 |
| WO | WO 2015/114592 A1 | 8/2015 |
| WO | WO 2016/077027 A1 | 5/2016 |
| WO | WO 2016/135561 A1 | 9/2016 |
| WO | WO 2017/049978 A1 | 3/2017 |
| WO | WO 2017/079474 A2 | 5/2017 |
| WO | WO 2017/115342 A1 | 7/2017 |
| WO | WO 2017/160276 A1 | 9/2017 |
| WO | WO 2018/039134 A1 | 3/2018 |
| WO | WO 2018/132378 | 7/2018 |
| WO | WO 2019/156955 A1 | 8/2019 |
| WO | WO 2019/156956 A1 | 8/2019 |

OTHER PUBLICATIONS

APGDT002, Microchip Technology Inc. http://www.microchip.com/, retrieved on: Nov. 3, 2017, 2 pages.

Bergenhem et al. "Overview of Platooning Systems", ITS World Congress, Vienna, Oct. 22-26, 2012, 8 pages.

BHAT "Travel Modeling in an Era of Connected and Automated Transportation Systems: An Investigation in the Dallas-Fort Worth Area," Techinal Report 122, Center for Transportation Research, Feb. 2017 [retrieved on Sep. 3, 2019], Retrieved from the Internet: <URL:http://www.caee.utexas.edu/prof/bhat/REPORTS/DSTOP_122.pdf> pp. 1-61.

Conduent™—Toll Collection Solutions, https://www.conduent.com/solution/transportation-solutions/electronic-toll-collection/, retrived on: Nov. 3, 2017, 3 pages.

DOSHI Review of the book "Security for Cloud Storage Systems" MEFHI, Gauridad Campus, India, 2014, pp. 1-2 [retrieved on Sep. 5, 2019], Retrieved from the Internet: <URL:https://www.iacr.org/books/2014_sp_yang_cloudstorage.pdf.

EyEQ4 from Mobileye, http://www.mobileye.com/our-technology, retrieved on Nov. 3, 2017, 6 pages.

Fehr-Peers "Effects of Next Generation Vehicles on Travel Demand and Highway, Capacity,"FP Think: Effects of Next-Generation Vehicles on Travel Demand and Highway Capacity Feb. 2014, [retrieved on Jun. 13, 2019], Retrived from the Internet: <URL:http://www.fehrandpeers.com/wp-content/uploads/2015/07/FP_Thing_Next_Gen_White_Paper_FINAL.pdf>pp. 1-39.

Flammini et al. "Wireless sensor networking in the internet of things and cloud computing era." Procedia Engineering 87 (2014): 672-679.

Fleetmatics https://www.fleetmatics.com/, retrieved on: Nov. 3, 2017, 6 pages.

HDL-64E of Velodyne Lidar, http://velodynelidar.com/index.html, retrieved on: Nov. 3, 2017, 10 pages.

Here, https://here.com/en/products-services/products/here-hd-live-map, retrieved on: Nov. 3, 2017, 5 pages.

Johri et al.,"A Multi-Scale Spatiotemporal Perspective of Connected and Automated Vehicles: Applications and Wireless Networking," in IEEE Intelligent Transportation Systems Magazine, vol. 8, No. 2, pp. 65-73, Summer 2016.

MAAβ et al., "Data Processing of High-rate low-voltage Distribution Grid Recordings for Smart Grid Monitoring and Analysis," EURASIP Journal on Advances in Signal Processing (2015) 2015:14 DOI 10.1186/s13634-015-02034[retrieved on Sep. 3, 2019], Retrieved from the Internet: <URL:https://link.springer.com/content/pdf/10.1186%2Fs13634-015-0203-4.pdf> pp. 1-21.

Miami Dade Transportation Planning Organization "First Mile-Last Mile Options with High Trip Generator Employers." MiamiDadeTPO.org. pp. 1-99 Jan. 31, 2018, [retrieved on Jun. 13, 2019], Retrieved from the Internet:<URL:http://www.miamidadetpo.org/library/studies/first-mile-last-mile-options-with-high-trip-generator-employers-2017-12.pdf>.

MK5 V2X ,Cohda Wireless,http://cohdawireless.com, retrieved on: Nov. 3, 2017, 2 pages.

National Association of City Transportation Officials. "Blueprint for Autonomous Urbanism". New York, NY10017, www.nacto.org, Fall 2017, [retrieved on Sep. 5, 2019]. Retrieved from the Internet: <URL:https://nacto.org/wp-content/uploads/2017/11/BAU_Mod1_raster-sm.pdf>.

Optical Fiber from Cablesys, https://www.cablesys.com/fiber-patch-cables/?gclid=Cj0KEQjwldzHBRCfg_almKrf7N4BEiQABJTPKH_q2wbjNLGBhBVQVSBogLQMkDaQdMm5rZtyBaE8uuUaAhTJ8P8HAQ, retrieved on: Nov. 3, 2017, 10 pages.

Portland "Portland Metro Area Value Pricing Feasibility Analysis" Oregon Department of Transportation, Jan. 23, 2018, pp. 1-29, [retrieved on Jun. 13, 2019], Retrieved from the Internet: <URL:https://www.oregon.gov/ODOT/KOM/VP-TM2-InitialConcepts.PDF>.

Products for Toll Collection—Mobility—Siemens—Siemens, https://www.mobility.siemens.com/mobility/global/en/urban-mobility/road-solutions/toll-systems-for-cities/products-for-toll-collection/pages/products-for-toll-collection.aspx, retrieved on: Nov. 3, 2017, 2 pages.

R-Fans_16 from Beijing Surestar Technology Co. Ltd, http://www.isurestar.com/index.php/en-product-product.html#9, retrieved on: Nov. 3, 2017, 7 pages.

Society of Automotive Engineers International's new standard J3016: "(R) Taxonomy and Definitions for Terms Related to Driving Automation Systems for On-Road Motor Vehicles" 2016, downloaded Dec. 12, 2016, 30 pages.

Society of Automotive Engineers International's new standard J3016: "Taxonomy and Definitions for Terms Related to On-Road Motor Vehicle Automated Driving Systems" 2014, downloaded Sep. 17, 2019, 12 pages.

Southwest Research Institute, Basic Infrastructure Message Development and Standards Support for Connected Vehicles Applications, Apr. 24, 2018. {retrieved on Sep. 3, 2019}. Retrieved from the Internet: <URL:http://www.cts.virginia.edu/wp-content/uploads/2018/12/Task4-Basic-lnfrastructure-Message-Development-20180425-Final.pdf> pp. 1-76.

STJ1-3 from Sensortech, http://www.whsensortech.com/, retrieved on Nov. 3, 2017, 2 pages.

StreetWAVE from Savari, http://savari.net/technology/road-side-unit, retrieved on: Nov. 3, 2017, 2 pages.

Surakitbanharn "Connected and Autonomous Vehicles: A Policy Review" Purdue Policy Research Institute, Feb. 2018, retrieved on Sep. 3, 2019, retrieved from the interned: <URL:https://www.purdue.edu/discoverypark/ppri/docs/CATV%20Policy%20Writeup%20Feb%202018.pdf> pp. 1-17.

(56) References Cited

OTHER PUBLICATIONS

TDC-GPX2 LIDAR of precision-measurement-technologies, http://pmt-fl.com, retrieved on: Nov. 3, 2017, 2 pages.
Teletrac Navman http://drive.teletracnavman.com/, retrieved on: Nov. 3, 2017, 2 pages.
Vector CANalyzer9.0 from vector https://vector.com, retrieved on Nov. 3, 2017, 1 page.
Williams "Transportation Planning Implications of Automated/Connected Vehicles on Texas Highways" Texas A&M Transportation Institute, Apr. 2017, 34 pages.
International Search Report of related PCT/US2018/012961, dated May 10, 2018, 16 pages.
International Search Report of related PCT/US2019/016606, dated Apr. 23, 2019, 21 pages.
International Search Report of related PCT/US2019/016603, dated Apr. 24, 2019, 17 pages.
International Search Report of related PCT/US2019/031304, dated Aug. 9, 2019, 17 pages.
International Search Report of related PCT/US2019/026569, dated Jul. 8, 33 pages.
International Search Report of related PCT/US2019/037963, dated Sep. 10, 2019, 54 pages.
International Search Report of related PCT/US2019/041004, dated Oct. 3, 2019, 18 pages.
International Search Report of related PCT/US2019/040814, dated Oct. 8, 2019, 20 pages.
International Search Report of related PCT/US2019/041008, dated Oct. 8, 2019, 16 pages.
International Search Report of related PCT/US2019/040819, dated Oct. 17, 2019, 41 pages.
International Search Report of related PCT/US2019/039376, dated Oct. 29, 2019, 11 pages.
International Search Report of related PCT/US2019/040809, dated Nov. 15, 2019, 17 pages.

* cited by examiner

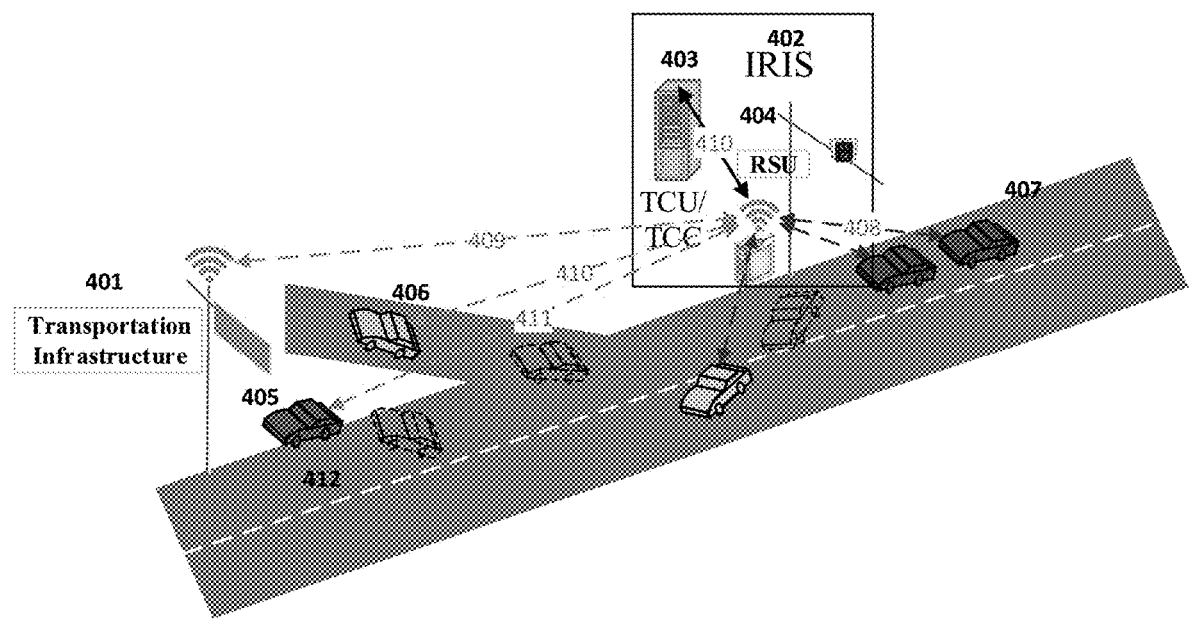
FIG. 4.1

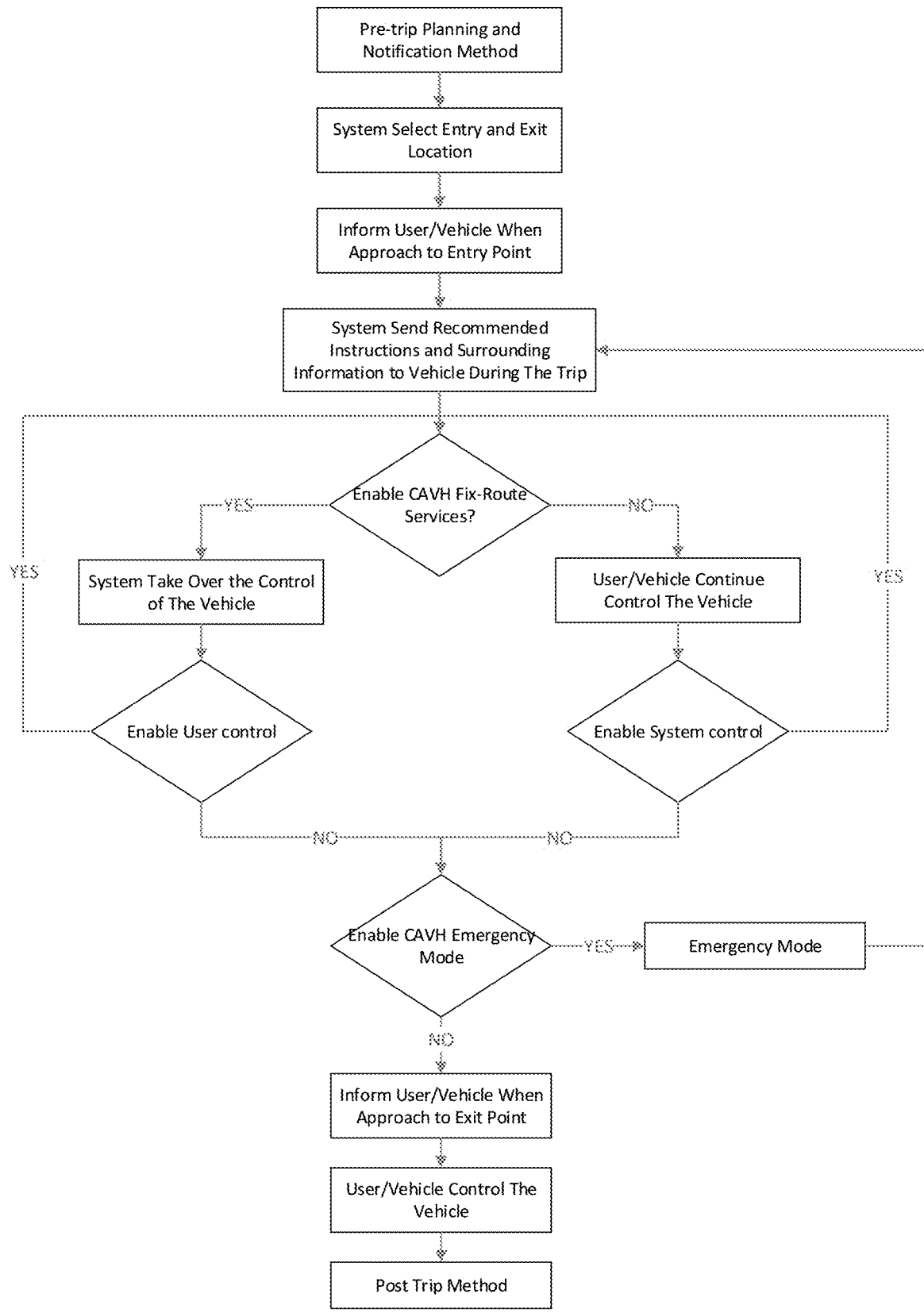
FIG. 4.2

FIXED-ROUTE SERVICE SYSTEM FOR CAVH SYSTEMS

This application claims priority to U.S. provisional patent application Ser. No. 62/696,177, filed Jul. 10, 2018, which is incorporated herein by reference in its entirety.

FIELD

The present technology relates to the detailed implementation of a cloud-based system that enables the functionalities of the connected and automated vehicle highway (CAVH) system. More specifically, the detailed CAVH cloud services and their interactions with CAVH system components to enable a wide range of system functionalities such as connectivity, sensing, control, planning, maintenance, security, and privacy protection.

BACKGROUND

Vehicles that are capable of sensing their environment and navigating without or with reduced human input (e.g., autonomous vehicles) are in development. At present, they are in experimental testing and not in widespread commercial use. Existing approaches require expensive and complicated on-board systems, making widespread implementation a substantial challenge.

SUMMARY

The present technology provides a detailed CAVH Cloud system design to provide sensing, prediction, control, prediction, storage, control, security, privacy as services. Each service interacts with different CAVH system components, e.g., at user end, vehicle end, CAVH infrastructure end, and/or transportation infrastructure end. The detailed enabling methods for the CAVH cloud includes, e.g., analytic and optimization methods, cloud computing methods, security methods, and privacy protection methods. Each method serves or interacts with one or more CAVH services.

In some embodiments, the cloud-based system interacts with CAVH system components such as users, vehicles, roadside CAVH components, and/or CAVH multi-layered control systems. In some embodiments, the cloud-based services enable CAVH system functionalities to ensure the connectivity, efficiency, mobility, safety, integrity, security, and privacy protection of the CAVH systems.

In some embodiments, the technology comprises a connected automated vehicle highway system (referred to herein as a CAVH system) and methods and/or components thereof as described in U.S. patent application Ser. No. 15/628,331, filed Jun. 20, 2017; and United States Provisional Patent Application Ser. No. 62/626,862, filed Feb. 6, 2018; 62/627,005, filed Feb. 6, 2018; 62/655,651, filed Apr. 10, 2018; and 62/669,215, filed May 9, 2018, the disclosure of each of which is herein incorporated by reference in its entirety. In some embodiments, the technology comprises a cloud system as described in U.S. Provisional Patent Application Ser. No. 62/691,391, incorporated herein by reference in its entirety.

Also provided herein are methods employing any of the systems described herein for the management of one or more aspects of traffic control. The methods include those processes undertaken by individual participants in the system (e.g., drivers, public or private local, regional, or national transportation facilitators, government agencies, etc.) as well as collective activities of one or more participants working in coordination or independently from each other.

Some portions of this description describe the embodiments of the technology in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Certain steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the technology may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Additional embodiments will be apparent to persons skilled in the relevant art based on the teachings contained herein.

BRIEF DESCRIPTION OF THE DRAWINGS

FIG. 4.1 is a schematic diagram showing exemplary methods for Enroute Dynamic Execution and Management for CAVH Fixed Route Service.

FIG. 4.2 is a flow chart presenting exemplary methods for Enroute dynamic trip execution and management for CAVH Fixed Route Service.

LEGEND

Figure 2:
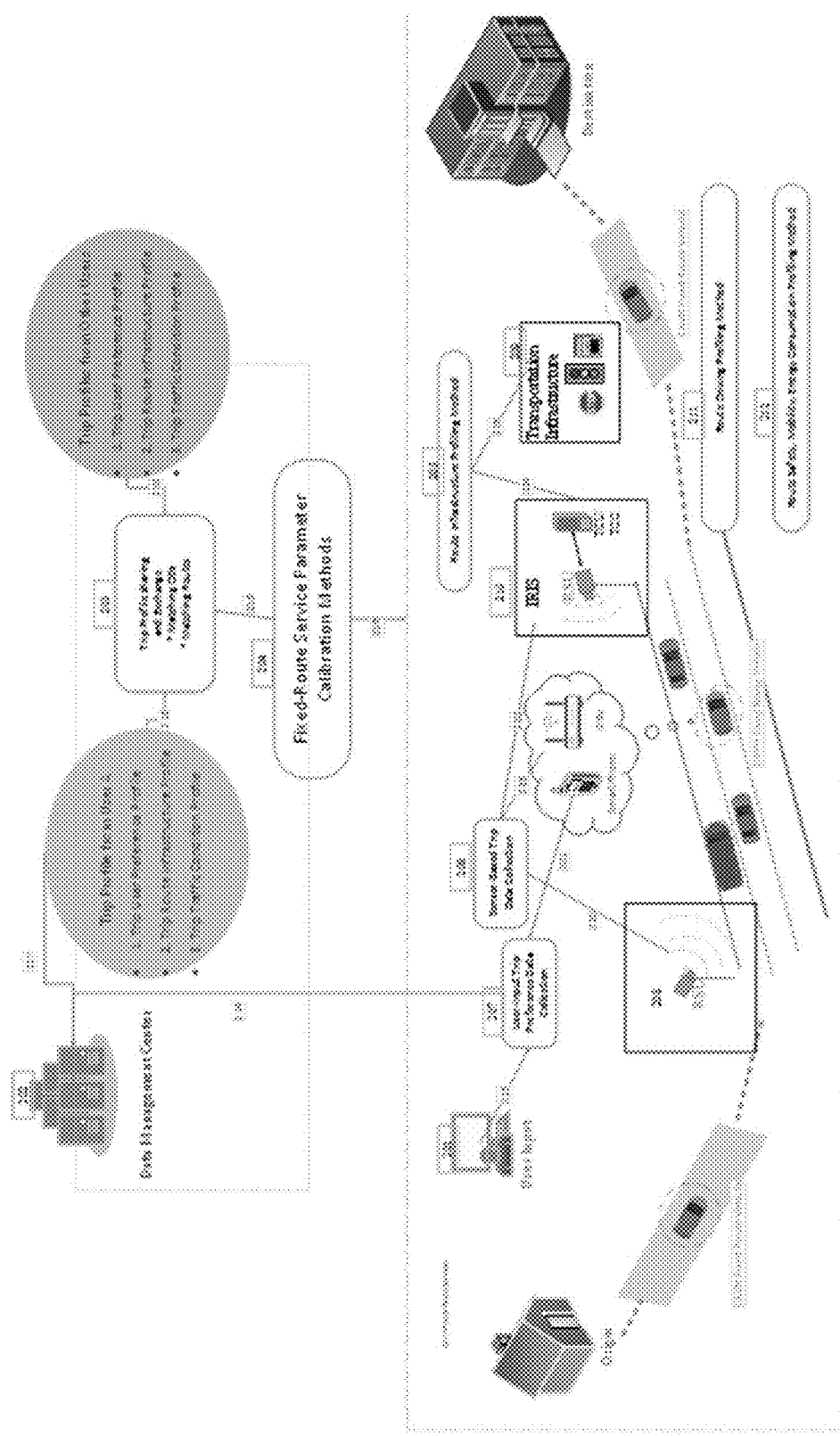
FIG. 2 presents exemplary CAVH fixed route service historical trip profiling methods.
Figure 7:
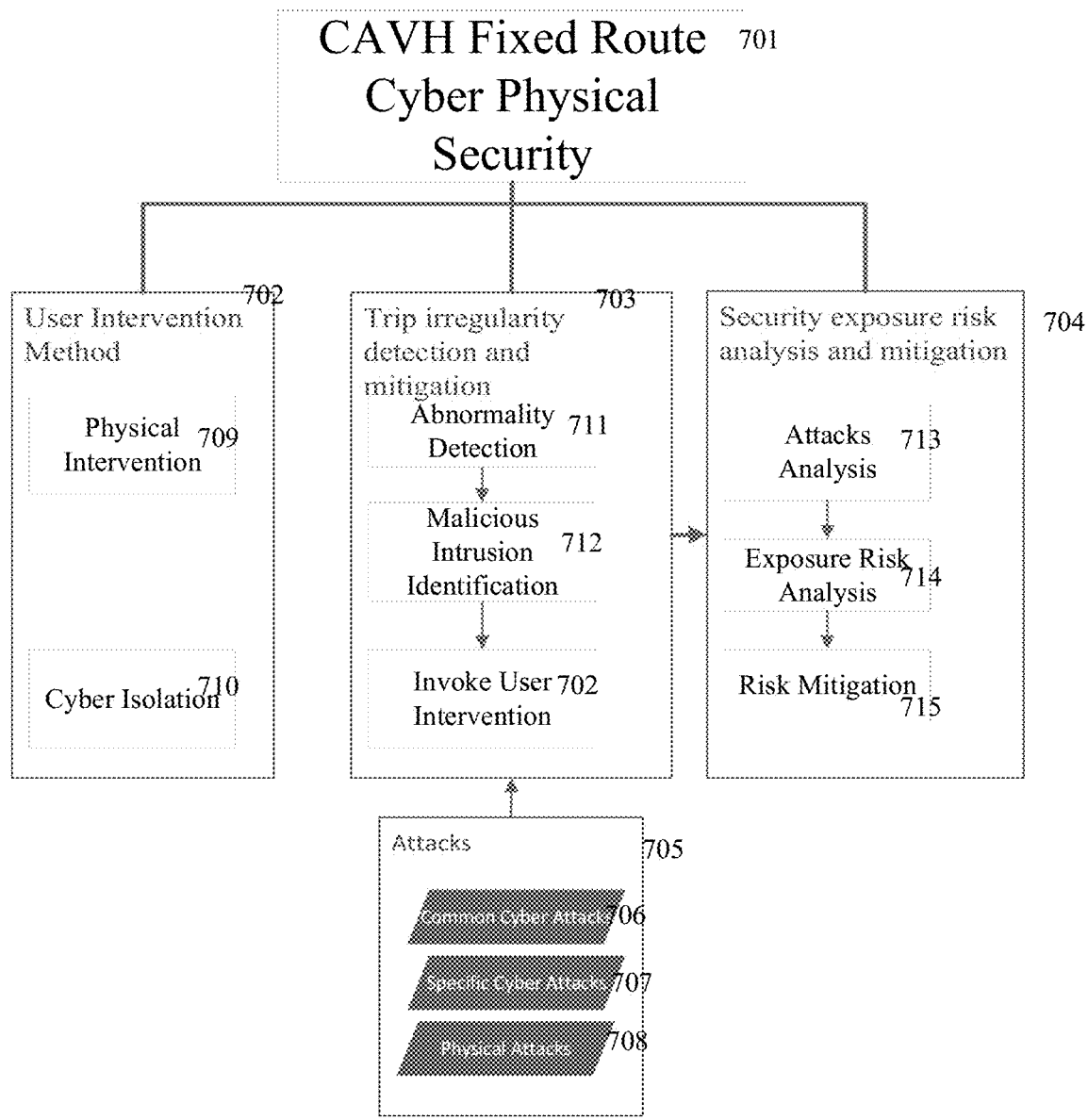
FIG. 7 presents exemplary methods for CAVH Fixed Route Service Cyber Physical Security.

FIG. 2:
201: User Preference Data Input
202: Data Management Center
203: Trip Profile Sharing and Exchange Methods
204: Method of Fixed Route Parameter Calibration
205: Route Infrastructure Profiling Method
206: Sensor Based Trip Data Collection
207: User-Input Trip Preference Data Collection
208: Road-Side Unit (RSU)
209: Transportation Infrastructure
210: IRIS system, including Traffic Control Unit (TCU) and Traffic Control Center (TCC)
211: Route Driving Profiling Method
212: Route Safety, Mobility, and Energy consumption Method
213: User Preference data input from Simulator, Survey, and Offline training process
214: User input data transferred to Data Management Center
215: Trip Profiling Method optimized with parameter calibration method
216: Outputs of Parameter Calibration Methods for CAVH fixed Route Service Optimization
217: User Obtain User Trip Profile from Data Management Center
218: User Trip Profile as Input for Trip Profile Sharing and Exchange Methods
219: Trip Profiles from Other Users as Input for Trip Profile Sharing and Exchange Methods
220: RSU sending data to Sensor-Based Trip Data-Collection
221: User input user trip preferences data using a smartphone
222: Sensor-based Trip Data Collection Method Using IRIS
223: Sensor-based Trip Data Collection Method Using OBU
224: Route Infrastructure Profiling Method Using IRIS system
225: Route Infrastructure Profiling Method Using Infrastructure Mapping information FIG. 3:
301: CAVH fixed route trip planning and notification methods
302: Pre-trip trip profile planning method
303: Pre-trip trip profile execution planning method
304: Pre-trip notification method
305: Pre-trip data exchange and feedback method
306: Routing preference in pre-trip trip profile
307: Time schedules in pre-trip trip profile
308: Trip chain plan in pre-trip trip profile
309: Multi modal trip plan in pre-trip trip profile
310: Clustering trip (platooning, ride-sharing) in pre-trip trip profile
311: Emergency Solutions in pre-trip trip profile
312: User trip demand for use in trip profile planning
313: User prevailing profiles for use in trip profile planning
314: Prevailing objective conditions for use in trip profile planning
315: Navigation plan of fixed route trip profile execution plan
316: Guidance plan of fixed route trip profile execution plan
317: Vehicle Control plan of fixed route trip profile execution plan
318: Notification of upcoming trip plan
319: Notification of timeline events
320: Notification of Temporary Change of Trip Profile
321: Data Exchange from CAVH fixed route services to the current trip execution
322: Data feedback from the current trip execution to CAVH fixed route services FIG. 4.1:
401: Transportation infrastructure
402: IRIS infrastructure
403: TCU/TCC
404: RSU
405: Vehicles under emergency management (left two vehicles)
406: Vehicles follow trip diversion (central four vehicles)
407: Vehicles follow trip execution (right two vehicles)
408: Communication between vehicles and RSU for trip execution
409: Communication between transportation infrastructure and RSU
410: Communication between vehicles and RSU for trip diversion
411: Communication between vehicles and RSU for emergency management
412: Emergency area FIG. 5:
501: CAVH Fixed Route Trip Chain Services
502: Trip chain planning method
503: trip chain optimization method
504: multi-modal and clustering trip plan method
505: Interim waypoints plan of trip chain plan
506: Routing plan of trip chain plan
507: User trip chain demand for use in trip chain plan
508: User profile for use in trip chain plan
509: Prevailing objective conditions for use in trip chain plan
510: Planned trip chain plan output from Trip chain planning method
511: Optimized trip chain plan which is output from Trip chain optimization method
512: Factors that influence trip chain plan optimization
513: Real-time traffic conditions
514: User trip chain demand and routes/trip chain preference
515: Plan of multi modal travel
516: Plan of platooning
517: Plan of car-pooling FIG. 6:
602: Confidential layer system
603: User-consented shared with public layer system
604: User-consented shared with friends layer system
605: Public route check-in (CAVH system) system
606: Privacy protection methods integrated system
607: Aggregating location into zones method system
608: Randomize location ID method system
609: Randomize user ID method system
610: Multiple encryption method system
611: Randomize trip ID method system
612: Randomize road segment ID method system
613: Travel route random/fuzzy decomposition method system
614: Reduce exposure of travel OD methods integrated system 615: Forbid reconstruction of travel trajectory methods integrated system
616: Fixed route privacy protection system to confidential layer communication
617: Fixed route privacy protection system to User-consented shared with public layer system communication
618: Fixed route privacy protection system to User-consented shared with friends layer system communication
619: Fixed route privacy protection system to Public route check-in (CAVH system) system communication
620: Confidential layer system to privacy protection methods integrated system communication
621: User-consented shared with public layer system to privacy protection methods integrated system communication
622: User-consented shared with friends layer system to privacy protection methods integrated system communication
623: Public route check-in (CAVH system) system to privacy protection methods integrated system communication
624: Aggregating location into zones method and system to reduce exposure of travel OD methods integrated system communication
625: Randomize location ID method system to reduce exposure of travel OD methods integrated system communication
626: Randomize user ID method system to reduce exposure of travel OD methods integrated system communication
627: Multiple encryption method system to reduce exposure of travel OD methods integrated system communication
628: Randomize trip ID method system to reduce exposure of travel OD methods integrated system communication
629: Randomize road segment ID method system to reduce exposure of travel OD methods integrated system communication
630: Travel route random/fuzzy decomposition method system to reduce exposure of travel OD methods integrated system communication;

FIG. 7:
701: CAVH fixed route cyber physical security methods
702: User intervention method
703: Attacks Detection Method
704: Security Exposure Risk Analysis and Mitigation Method
705: Cyber Physical Attacks
706: Common cyber attacks
707: Cyber attacks specifically aiming at fixed route services
708: Physical attacks aiming at fixed route services
709: Physical intervention in user intervention method
710: Cyber isolation in user intervention method
711: Abnormal activity detection
712: Malicious intrusion detection
713: Cyber physical attacks analysis
714: Security exposure risk analysis
715: Security exposure risk mitigation FIG. 8:
801: Touch Screen UI
802: Eyes detector
803: Body motion camera
804: Voice recognition
805: Vibration Wheel
806: Hot button
807: Vehicle Sensors
808: IRIS
809: CAVH Clouds
810: CAVH System
811: In-vehicle processor FIG. 9:
901: User charging and reward system
902: User charging services system
903: Pay-per-user charging service system
904: Pay-per-mile charging service system
905: Daily subscription charging service system
906: Monthly subscription charging service system
907: Payment discounting services system
908: Money payback by times of use service system
909: Discount by membership service system
910: Discount by sharing data service system
911: More charge/more discount service system
912: Reward mechanisms for data input/sharing system
913: Trip-based reward method system
914: Daily incremental rewarding method system
915: Specific day rewarding method system
916: Data quality-based evaluation methods system
917: Data contribution-based evaluation methods system
918: User charging and reward system to user charging services system communication
919: User charging and reward system to payment discounting services system communication
920: User charging and reward system to reward mechanisms for data input/sharing system communication
921: User charging services system to payment discounting services system communication
922: Payment discounting services system to reward mechanisms for data input/sharing system communication
923: Reward mechanisms for data input/sharing system to data quality-based evaluation methods system communication
924: Reward mechanisms for data input/sharing system to data contribution-based evaluation methods system communication FIG. 10:
1001: User
1002: RSU
1003: CAVs in ride sharing service
1004: Communication between users and RSU
1005: Ride sharing service communication between CAVs and RSUs
1006: CAVs in ride-platooning service
1007: Ride platooning service communication between CAVs and RSUs Definitions To facilitate an understanding of the present technology, a number of terms and phrases are defined below. Additional definitions are set forth throughout the detailed description.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator and is equivalent to the term "and/or" unless the context clearly dictates otherwise. The term "based on" is not exclusive and allows for being based on additional factors not described, unless the context clearly dictates otherwise. In addition, throughout the specification, the meaning of "a", "an", and "the" include plural references. The meaning of "in" includes "in" and "on."

As used herein, the terms "about", "approximately", "substantially", and "significantly" are understood by persons of ordinary skill in the art and will vary to some extent on the context in which they are used. If there are uses of these terms that are not clear to persons of ordinary skill in the art given the context in which they are used, "about" and "approximately" mean plus or minus less than or equal to 10% of the particular term and "substantially" and "significantly" mean plus or minus greater than 10% of the particular term.

As used herein, the suffix "-free" refers to an embodiment of the technology that omits the feature of the base root of the word to which "-free" is appended. That is, the term "X-free" as used herein means "without X", where X is a feature of the technology omitted in the "X-free" technology. For example, a "sensing-free" method does not comprise a sensing step, a "controller-free" system does not comprise a controller, etc.

As used herein, the term "support" when used in reference to one or more components of the CAVH system providing support to and/or supporting one or more other components of the CAVH system refers to, e.g., exchange of information and/or data between components and/or levels of the CAVH system, sending and/or receiving instructions between components and/or levels of the CAVH system, and/or other interaction between components and/or levels of the CAVH system that provide functions such as information exchange, data transfer, messaging, and/or alerting.

DETAILED DESCRIPTION

In some embodiments, provided herein are technologies related to safety systems and methods for traffic operations and control systems for connected and automated vehicles and highways (e.g., a CAVH system (e.g., as described in U.S. patent application Ser. No. 15/628,331, filed Jun. 20, 2017 and United States Provisional Patent Application Ser. No. 62/626,862, filed Feb. 6, 2018, 62/627,005, filed Feb. 6, 2018, 62/655,651, filed Apr. 10, 2018, and 62/669,215, filed May 9, 2018, the disclosures of which are herein incorporated by reference in their entireties).

In some embodiments, the technology provided herein relates to embodiments of CAVH services for fixed-route trips, e.g., commuting, shopping, school, and other trips that users travel recurrently and frequently. In some embodiments, the technology comprises a system having an architecture of fixed-route services. In some embodiments, the technology includes methods of calibrating, providing, and optimizing the functionalities of such fixed-route services. In some embodiments, methods are provided for pre-trip, enroute, trip chaining, and post-trip operations. In some embodiments, the technology relates to cyber-security, physical security, and privacy protection for the users and participating vehicles.

In some embodiments, the present technology provides a detailed CAVH Cloud system design to provide sensing, prediction, control, prediction, storage, control, security, privacy as services. Each service interacts with different CAVH system components at user end, vehicle end, CAVH infrastructure end, transportation infrastructure end. The detailed enabling methods for the CAVH cloud includes the analytic and optimization methods, cloud computing methods, security methods, and privacy protection methods. Each method serves or interacts with one or more CAVH services.

In this detailed description of the various embodiments, for purposes of explanation, numerous specific details are set forth to provide a thorough understanding of the embodiments disclosed. One skilled in the art will appreciate, however, that these various embodiments may be practiced with or without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of the various embodiments disclosed herein.

Figure 1:
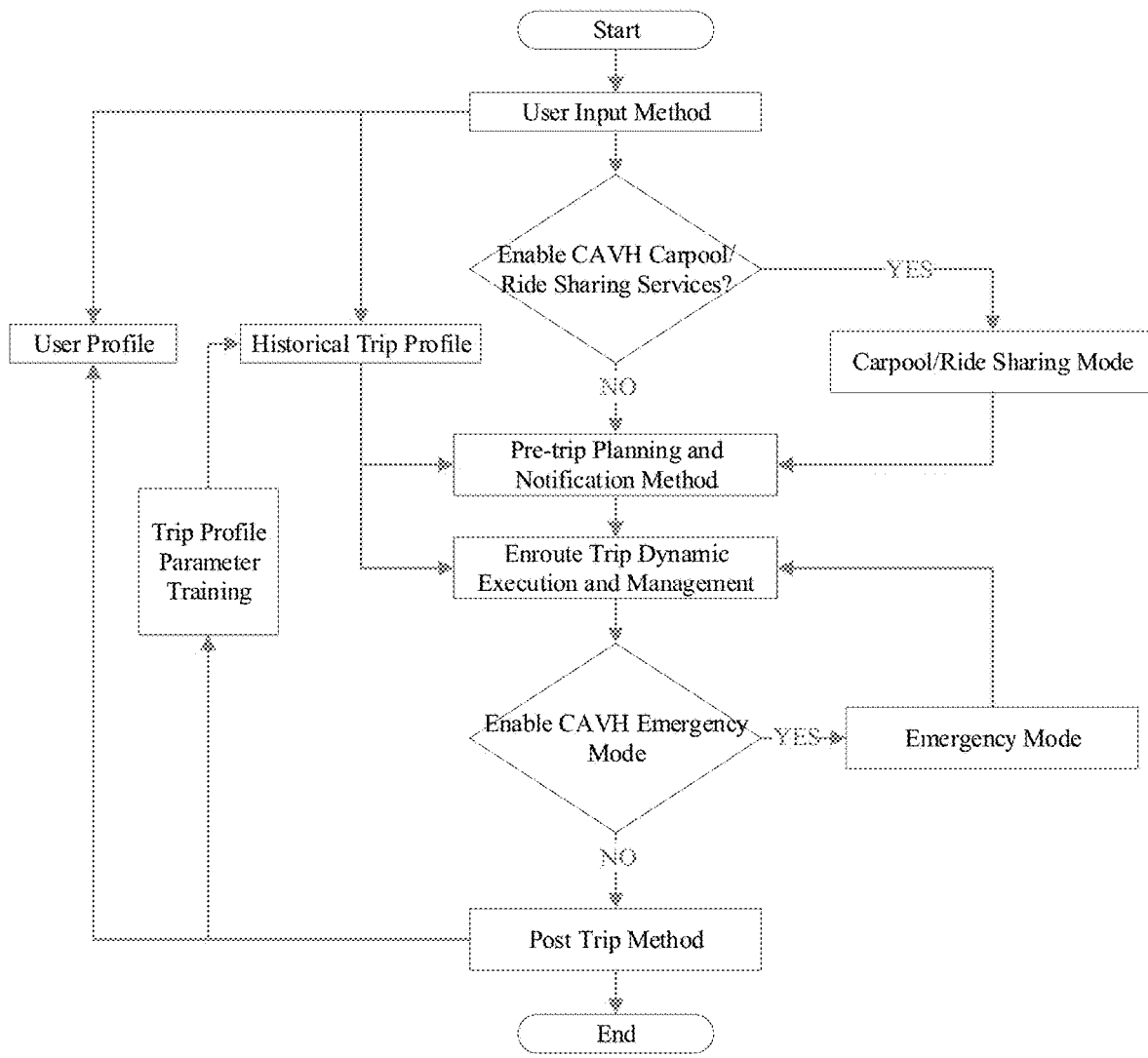
FIG. 1 presents an exemplary CAVH fixed route service method flow chart.

FIG. 1 shows a basic CAVH fixed-route service system flow chart. Fixed-route service starts with user input method including user preference, behavior, OD information, etc. If user is new to the system, system stores the user's information into a user profile as a virtual anonymous account and his/her unique historical trip/route is stored to a historical trip profile for further analysis and use. The historical trip profile sends useful information such as optimized route plan, customized diversion plan, etc. to every step in fixed-route service. The system then asks user whether to enable CAVH carpool or ride-sharing service. If the user wants to use the service, it directs the user to carpool/ride sharing service. If not, the system executes pre-trip planning and notification based on user input. After trip start, the system activates enroute trip dynamic execution and management for a safer, more economic, and more efficient trip service. If the system detects or encounters an emergency, it activates an emergency mode and controls the vehicle and parks at an emergency parking area. If not, system successfully delivers the vehicle to the destination and follows the post trip method such as user charging, feedback analysis, service rating, etc.

FIG. 2 illustrates how exemplary trip profiling methods are executed through various CAVH fixed route service components from origin to destination of an entire route under the traffic data management center 202. For an individual road user-A, his/her profile data are collected through both user-input method 207 and sensor-based methods 206. Trip profiles from other users can be exchanged through trip profile sharing and exchange methods 203 to identify the best execution plan based on similar behavioral and preference constraints. Sensor-based data collection method 206 collects trip data of three levels: 1. Navigation data by recording adequate sequence of waypoints (e.g., latitude & longitude coordinates) from origin to desired destination; 2. Guidance data: when and where the CAVH vehicle chooses to perform lane changing, overtaking, or following; 3. Control data such as vehicle steering and velocity commands from both OBU and RSU. User input preference survey 201 and 221 is obtained at the beginning of receiving this service, so that this system can offer customized travel plan for different users. Route Driving profiling method incorporates information related to driving behavior strategy (e.g., continue straight, turn left, turn right, slow down, speed up, or braking). Route Infrastructure Profiling Method 205 includes CAVH infrastructure data 209 and IRIS system 210, e.g., road geometry, lane configuration and usage, signal controller data, intersection layout, merging/diverging alert information, etc. Infrastructure data is updated through dynamic indexing and segmentation and real-time feedback. Parameter calibration methods 204 employ multi-objective optimization methods to meet the requirements for both transportation operators and CAVH users. Objectives consist of minimizing system delay, increasing driver awareness, increasing system reliability and safety, etc., with control variables determining vehicle assignment, dispatching, activation, deactivation, routing, and vehicle modes (e.g. eco-, aggressive, conservative).

Figure 3:
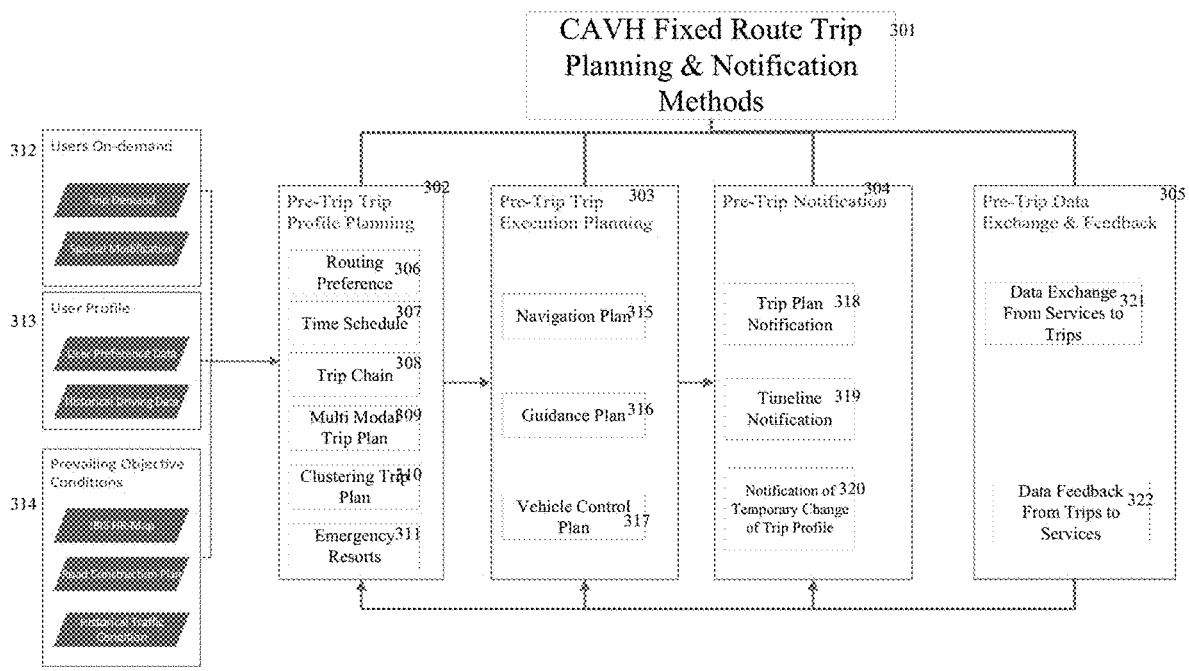
FIG. 3 presents exemplary CAVH Fixed Route Service Trip Planning and Notification Methods.

FIG. 3 shows pre-trip planning and notification methods of CAVH fixed route services (301) configured to generate pre-trip profiles (302) for the planning of a CAVH fixed route trip. The pre-trip profiles include, e.g., routing preference (306), time schedule (307), trip-chaining requirements (308), multi-modal preference (309), clustering traffic preference (e.g. ride-sharing, platooning) (310), CAVH service schedule (311), and emergency resorts (312). The generation of pre-trip profiles is based on the prevailing objective conditions 314 (e.g. weather, traffic, recurrent congestion, construction plan, IRIS HR-Map, etc.) and user information including on-demand information (312) and user preference with historical activity analysis (313). The generated CAVH fixed route trip plan is fulfilled by CAVH fixed route services by initializing and executing the control of CAVH vehicles (303) in levels of navigation 315 (e.g. turning points, merging points, entry/exit points, routing, etc.), guidance 316 (e.g. safety/mobility/eco-driving configuration in terms of speed/lane, etc.), and control 317 (e.g. control of steering wheel, pedal, braking, etc.). The user receives the pre-trip notification (304) from CAVH fixed route services before departure regarding the upcoming trip profile (318), critical timeline notification (319), and temporary plan changes (320). The CAVH fixed route services send the pre-trip profile and notification activities to the users for the current trip 321, and collect the data feedback from the execution of current trip to CAVH services for further planning and notification 322 through data exchange and feedback method 305.

FIG. 4.1 shows basic segment of enroute dynamic trip management and execution for CAVH fixed-route service system. During the trip, vehicles 407 execute three major driving tasks for lateral and vertical control, car following, and merging/diverging/passing, etc. by communicating with RSUs 408. If vehicles encounter emergencies 412 including user, vehicle, and/or system emergency, CAVH system controls vehicle 405 in emergency mode (e.g., park to the side) 412 though RSUs 411. Then system selects diversion plans for vehicles 406 based on historical data and current conditions though communication between vehicles and RSUs 410.

FIG. 4.2 shows basic enroute dynamic trip execution and management flow chart. After pre-trip planning and notification method, system selects entry and exit locations based on the trip plan selected by the user and starts the trip. When approaching the entry point, system informs user/vehicle and asks whether to enable fixed-route service. If a user wants to continue controlling the vehicle, he/her still can enable the service any time until the vehicle exits the exit point. Same with the other option: if a user enables the service, he/she can switch to manual driving any time during the trip. During the trip, the system sends recommended instructions and surrounding (e.g., environment) information to the vehicle regardless of the mode of vehicle control. If a vehicle encounters an emergency, the system activates an emergency mode; otherwise, the system informs the user and goes to a post-trip method when approaching an exit point.

Figure 5:
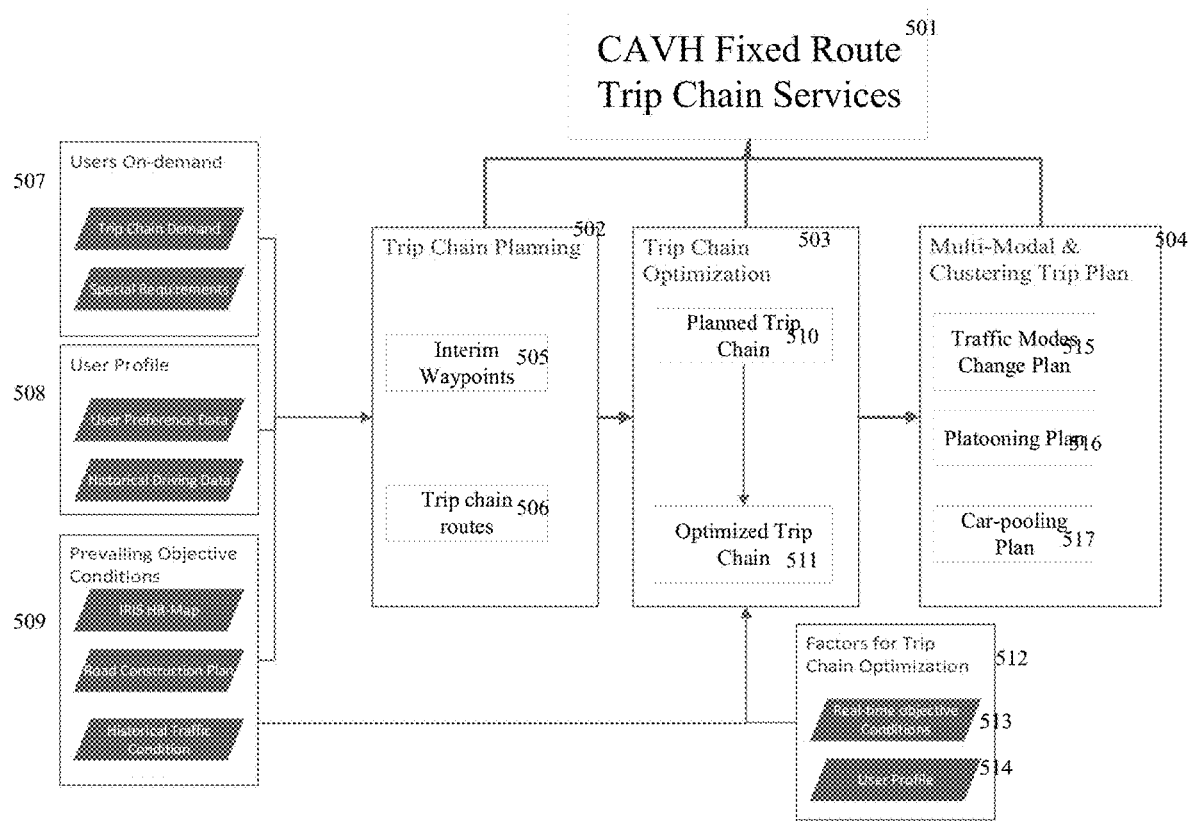
FIG. 5 is a schematic diagram showing exemplary CAVH Fixed Route Service Trip Chain Services.

FIG. 5: The trip chaining methods of CAVH fixed-route services 501 generate a plan of trip chaining (502) in terms of interim waypoints (505) and routes (506) based on user requests (507), user historical profiles (508), and prevailing objective conditions 509 (e.g., weather, traffic, recurrent congestion, construction plan, etc.). The routing of a trip chain plan is optimized (503) based on the original trip chain plan 510, user profile 514 (e.g., including driving style, preferred path, time/distance/comfortable sensitivity, etc.) and the real-time objective conditions 513 including the topologies of involved road networks, real-time traffic condition, and updated weather information, etc. CAVH fixed-route services also takes into account a multi-modal and/or clustering trip for the fulfillment of the trip chain based on the demand and preference of the current user, the availability of services, and historical recurrent traffic conditions/schedules. The multi-modal and/or clustering trip plan 504 includes locations and time schedule of changing travel modes 515, location and time schedule of join/exit platoon 516, and locations and time schedule of pick-up/drop-off of car-pooling 517.

Figure 6:
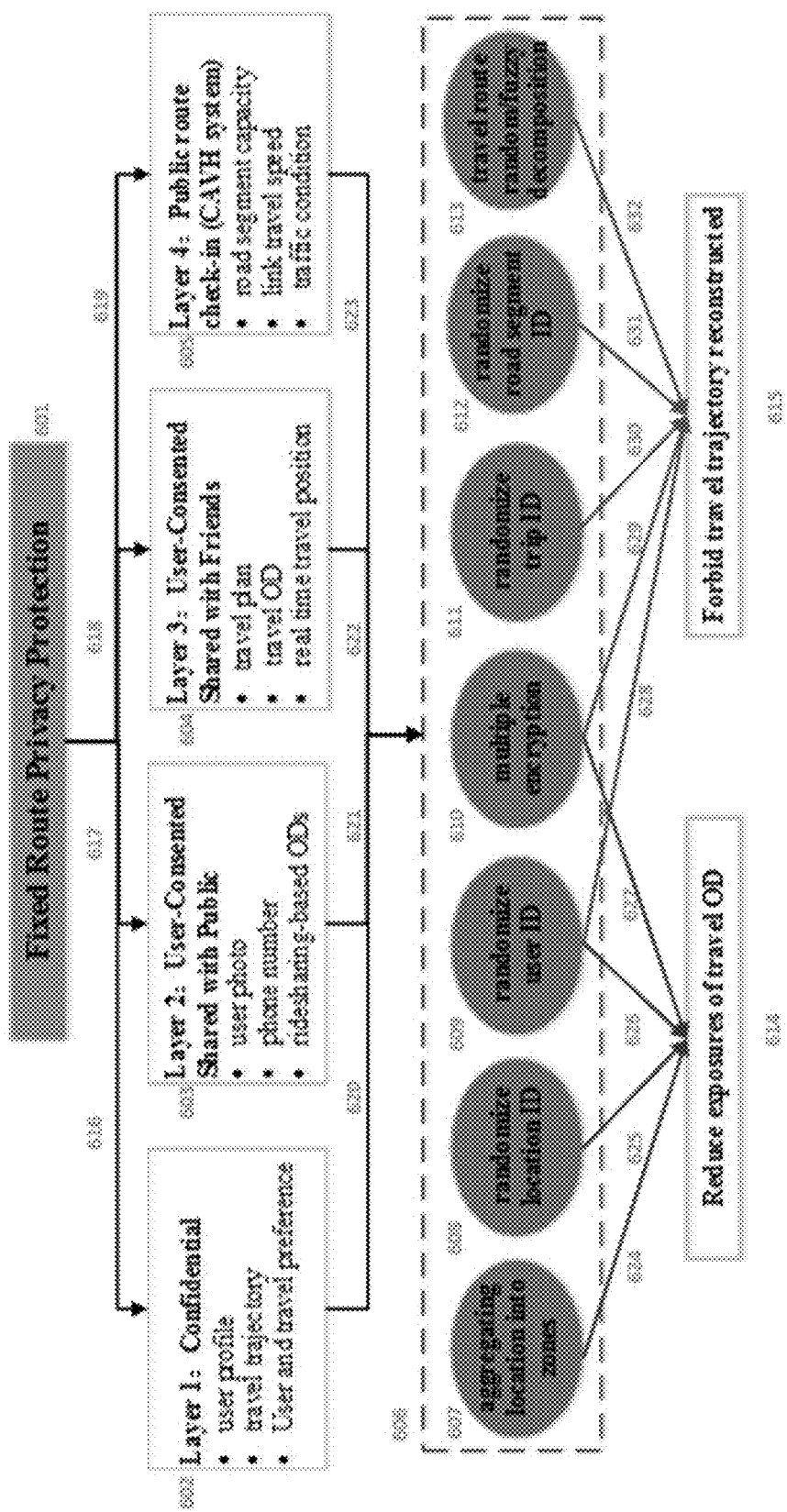
FIG. 6 presents exemplary methods for CAVH Fixed Route Service Privacy Protection.

FIG. 6 shows an exemplary CAVH fixed route privacy protection system. Embodiments of the fixed-route privacy protection system 601 comprise the following components: Confidential layer system 602, User-consented shared with public system layer system 603, User-consented shared with friends layer system 604, and public route check-in (CAVH system) system 605. The fixed-route privacy protection system controls the communication between the systems. The privacy protection methods integrated system 606 comprises the following method system components: aggregating location into zones method system 607, randomize location ID method system 608, randomize user ID method system 609, multiple encryption method system 610, randomize trip ID method system 611, randomize road segment ID method system 612, and/or travel route random/fuzzy decomposition method system 613. The reduce exposures of travel OD system 614 and forbid reconstruction of travel trajectory system 615 are used to reduce travel OD exposures and forbid (e.g., minimize and/or eliminate) a travel trajectory to be reconstructed.

FIG. 7 The cyber-physical security methods 701 of CAVH fixed-route services protect the CAVH user-vehicle systems from cyber-physical attacks 705. The attacks include cyber-attacks (e.g., common cyber-attacks 706 such as malicious information fraud and network attacks and cyber-attacks aiming at fixed route system 707 (e.g., hacking cyber system which may result in leaking of user personal information, leaking/illegally changing of trip plan, losing the control of vehicles, etc.)) and physical-attacks 708 (e.g., physical probe attacks such as camera shots which may result in privacy leaking). The cyber-physical security methods detect the attacks 703 through detecting any irregularity in trip activities 711 (e.g., abnormal deviation of vehicle status and trip trajectories from a chosen and/or designated profile and plan), and identifying the malicious intrusion 712 of user-vehicle system. Once the attacks are detected, a user intervention method 702 is invoked to protect the user-vehicle system by physically taking over the vehicle control and shutting down all CAVH functions except the minimum necessary ones 709, and creating a cyber-isolation environment to prevent all possible cyber intrusions 710. In order to prevent the security exposure risks 704 that are more dangerous in fixed-route trips where attackers can make repeated attempts, the cyber-physical security methods detect and analyze possible attack attempts 713, identify the cyber-physical exposure risks 714 and mitigate risks 715 by network protection, add random factors to a fixed recurrent route to mitigate the potential repeated attack attempts, and launch user intervention methods when attacks happen.

Figure 8:
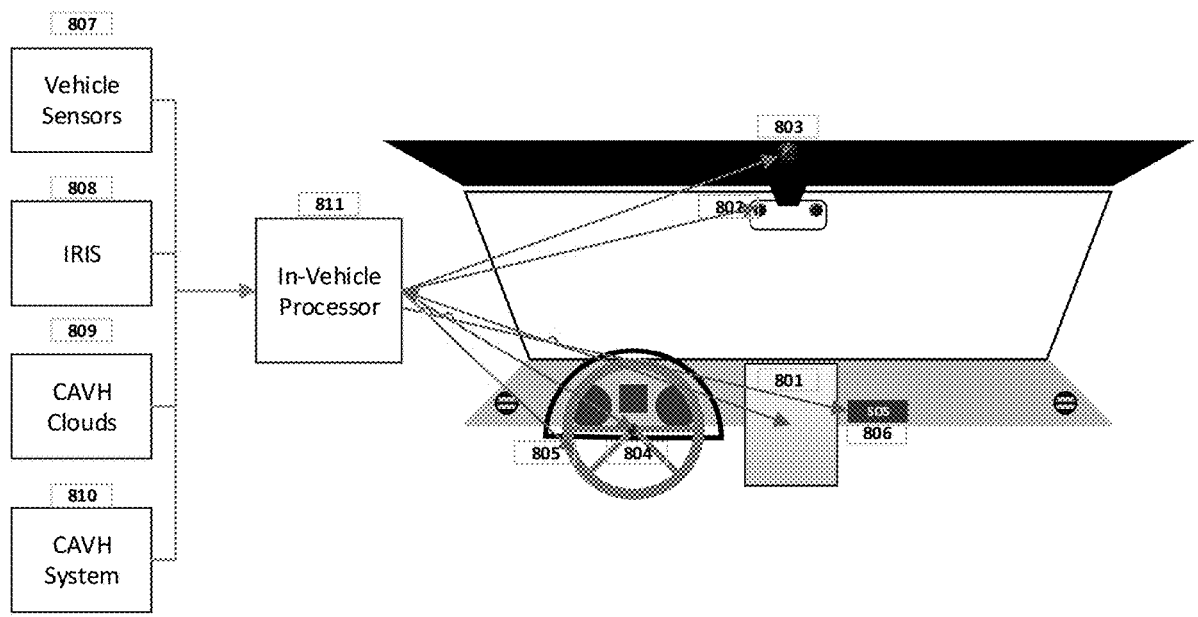
FIG. 8 presents an exemplary CAVH Fixed Route Service human machine interface.

FIG. 8 shows a basic interior of human-machine interface in a connected-automated vehicle. For the human side, an exemplary CAVH comprises, e.g., a touch screen UI 801, eyes detectors 802, body motion camera 803, voice recognition component 904, vibration wheel 806, and/or a hot button 806 for user to interact with CAVH system. For the machine sides, an exemplary CAVH comprises vehicle sensors 807, IRIS 808, CAVH Cloud 809, CAVH system 810, and in-vehicle processors 811 to provide information for users and process user input for further operations and instructions such as activate emergency mode and/or contact third party service.

Figure 9:
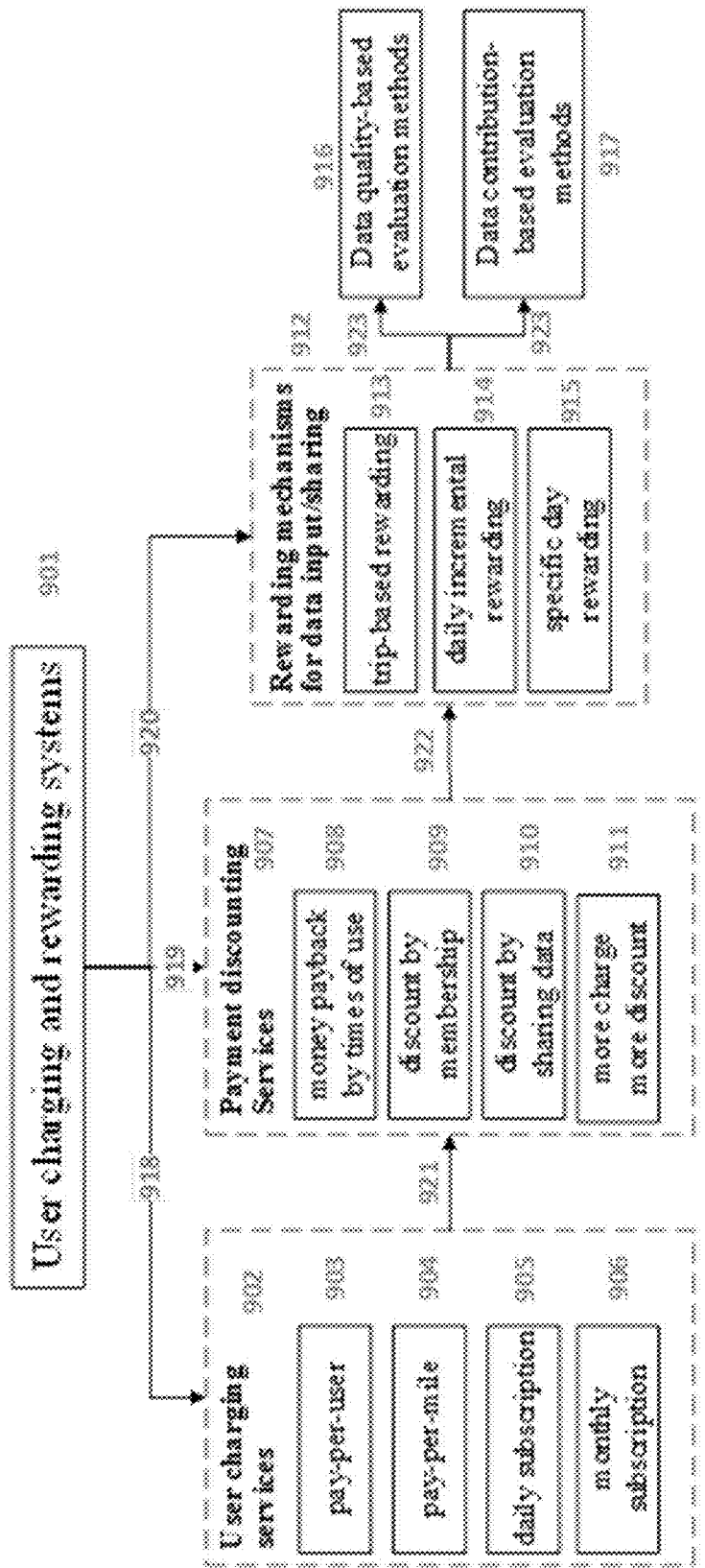
FIG. 9 presents exemplary CAVH Fixed Route Service user charging and reward systems.

FIG. 9 shows an exemplary CAVH fixed-route user charging and reward system. In some embodiments, fixed route charging and reward system 901 comprises the following components: User charging services system 902, Payment discounting services system 903, and reward mechanisms for data input/sharing system 904. The User charging services system comprises the following components: Pay-per-user charging service system 903, Pay-per-mile charging service system 904, Daily subscription charging service system 905, and/or Monthly subscription charging service system 906. The Payment discounting services system comprises the following components: money payback by times of use service system 908, discount by membership service system 909, discount by sharing data service system 910, and more charge/more discount service system 911. The reward mechanisms for data input/sharing system comprises the following components: trip-based reward method system 913, daily incremental reward method system 914, and specific day reward method system 915. Data quality-based evaluation methods system 916 and data contribution-based evaluation methods system 917 are used to evaluate the user input/sharing data for reward assessment.

Figure 10:
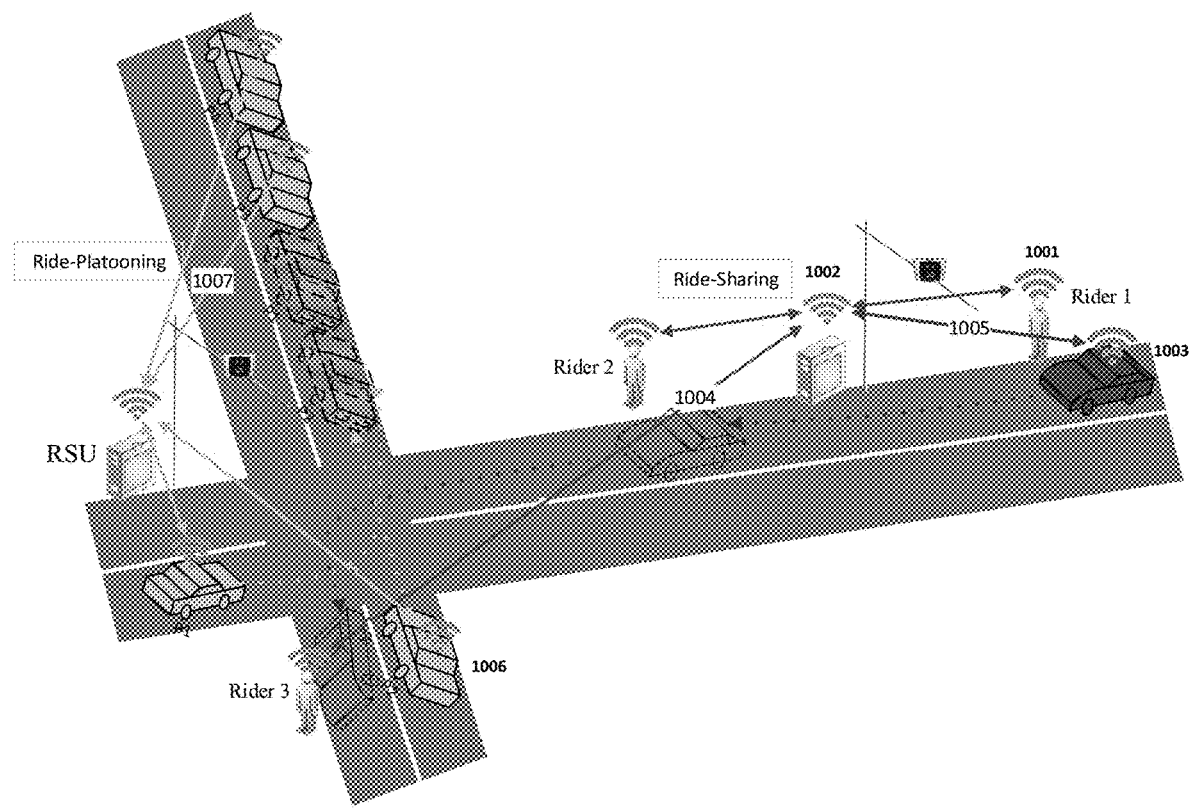
FIG. 10 presents exemplary systems for CAVH Fixed Route Service ride-sharing and ride-platooning.

FIG. 10 shows exemplary basic ride-sharing and ride-platooning services in CAVH fixed-route service system. For ride-sharing service, system 1002 receives a plurality of user 1001 inputs and groups them into a single CAVH trip by matching their schedules, origin-departure information (OD), route similarity, user preferences, priority levels, etc. Then, the system schedules pick-up and drop-off locations and timings for each user and communicates with CAVs 1005 for dynamic assistance and control. Then, user receives the pre-trip notification 1004 from the system and waits for CAVs to pick up. Different from ride-sharing services, ride-platooning services focus on scheduling and grouping vehicles 1006 with similar route plans by considering more effective control methods for, e.g., departure time, waiting time deployment, and adhesive schedule control.

The following numbered paragraphs relate to particular embodiments of the technology described herein.

1. CAVH Fixed-Route Systems (System, Independent):
1.1 A CAVH Fixed-Route Service System Comprised of User, Vehicle, Infrastructure, Network, and computing components to support the calibration, pre-trip, enroute, trip-chaining, and post-trip operations, security, and privacy protection.
1.2 The methods of fixed-route CAVH services include the training, profiling, and calibration methods of the services based on historical travel records, the vehicle navigation, guidance, control and optimization methods before, during, and after CAVH trips, the planning and execution methods for trip chaining and ridesharing, human-machine interface for user inputs, cyber-physical security methods against attacks to the services, and privacy protection methods to avoid the exposure of the user home and destination information.

2. Historical Trip Profile Training
Historical Trip Profile Training System and Methods, wherein said Historical Trip Profile Training Methods comprise of trip recording, analytics, data sharing and exchange, service map creation, route profiling, and calibration methods.

2.1 Sensor-based trip data archiving methods of collecting and archiving the trip profile data and the detailed manual driving data including the navigation, guidance and control data with 1) mobile applications with smartphone or OBU (on-board unit) visual, gyroscope and accelerometer sensors, 2) CAVH RSUs (road-side units) located along the routes, and 3) user survey inputs from users such as their trip preference data, are aggregated to form a complete picture of spatiotemporal environments.

2.2 User Input Trip Preference Data Collection Methods: Methods of collecting user preference data including their time sensitivity, driving comfort levels, route preferences, detouring preferences, etc., by text-based or visual-based user preference survey, virtual simulator, or other active data input methods to allow system to customize the fixed-route services before the trip.

2.3 Trip profile sharing and exchange methods, in which users sharing the same route, same segments, or same ODs and with similar departure and arrival times share their user profiles to collectively identify the optimal trip execution plans with similar behavioral and preference constraints.

2.4 Route driving profiling methods of using historical driving data collected by methods described in Claim 2.1 to identify user trip characteristics such as route choice, destination/parking/entrance location, driving and control strategy, driving behavior and styles (e.g. aggressive and conservative) for designing real-time CAVH trip execution plans.

2.5 Route infrastructure profiling methods of using user historical travel profile and characteristics to identify regular transportation infrastructures, CAVH IRIS system infrastructures and their activation sequences for system load optimization and balancing to provide the fixed-route services.

2.6 Route Safety, Mobility, and Energy Consumption Profiling methods of collecting link-by-link safety conditions, recurrent traffic conditions, CAVH infrastructure locations and operating states and integrating user preference data and user strategic data (merging, lane choice etc.) to support vehicle control and driver behavioral distribution analysis.

2.7 Fixed-Route Service Parameter Calibration Methods of using the route profile data collected by methods described in 2.1-2.6 to calibrate fixed-route service parameters of pre-trip, during-trip operations, emergency management, and other services to 1) satisfy user trip preferences and 2) to optimize the safety, mobility, and energy consumption of the CAVH fixed-route services for both general trip planning and real-time operations in response to different traffic conditions (e.g. congestion, free-flow, inclement weather, incidents) and trip conditions (e.g. early or late, flexible arrival times).

3. Trip Planning and Pre-Trip Notification Methods

The methods to plan a CAVH fixed route trip and notify users before departure with pre-trip planning, notification, dynamic information exchange and feedback with CAVH control systems.

3.1 The pre-trip trip profile planning methods of customizing or adjusting trip profiles including primary and alternative routing, departure time, trip chaining, multi-modal, platooning, CAVH entry and exiting, and emergency planning based on prevailing weather, traffic conditions, recurring congestion or construction events, user activity and scheduling status (e.g. cancellation, running early or late), and user preference data from historical data analytics as described in Claim 2.

3.2 Pre-trip trip execution planning methods of initialization and customization of the detailed CAVH automated driving control including the detailed turning points, merging points, entry/exiting points, travel speed, lane selection, early/late-merge planning, alternative route execution plans, and related safety, mobility, and green driving control configurations.

3.3 Pre-trip notification methods of using the output of planning methods as described in Claim 3.1 and the timeline to provide trip profile notification such as departure time, destination and trip chaining, travel modes for the scheduled fixed-route CAVH trip both on-schedule (e.g. 1 hour, 30 min, 15 min, 5 min warnings as configured by users) or temporary change of trip profiles due to interrupting events such as incidents, constructions, and other special events.

3.4 Pre-trip data exchange and feedback methods comprises of 1) data inputs from CAVH system to current trip for the planning and notification activities as described in Claims 3.1 and 3.2, and 2) data feedback from the current trip to CAVH system data exchanging including the exchange of pre-trip plans and user status for CAVH systems to plan and coordinate related CAVH trips and control resources.

4. Enroute Dynamic Trip Management and Execution 4.1 Entry and Exiting CAVH System: CAVH system selects entry and exiting locations of the system in a customized routing plan described in Claim 4.1 by maximizing safety, reliability, efficiency. Vehicle and user are informed whether system need to take over the control before entering road segment that controlled by CAVH system. System is always ready to take over the control and sends recommended instructions and surrounding information to vehicles during the trip. When approach exit of the system, users and vehicles are informed to prepare take over the control back.

4.2 Interaction with non-CAVH infrastructure: CAVH system interacts with transportation infrastructure to share or pull useful information such as sensing data, traffic signal timing to compute real-time vehicle control plan and alternative routing and diversion plan and interact with smart and connected traffic control devices for safety, efficient, and green vehicle control during the trip.

4.3 Interaction with IRIS infrastructure: CAVH system interact with IRIS infrastructure by two scenarios that can switch seamlessly:
  1) planned interaction: IRIS use information such as vehicle location, trip route, etc. from system and vehicles to perform planned platooning, ridesharing, trip optimization, etc. though its four major functions including sensing, planning, control, prediction;
  2) unplanned interaction: IRIS compute real-time alternative routes, schedules, communicate with other service, platform and send instructions to vehicle when reach unplanned situation such as user/vehicle incident, emergency delay etc.

4.4 Trip execution: CAVH system execute three major driving tasks during the trip:
  Navigation: system adjust and plan route such as critical routing points while enroute based on user profile dynamic traffic situation such as congestion, safety and user's requirement.
  Guidance: system generate car/road following, merging/diverging, passing based on CAVH user profile, facility map, unexpected hazards and physical environment;
  Control: system take coordinate or remote control seamlessly at certain location in fixed route according to the user profile such as segments with recurrent congestion or segments with safety risks 4.5 Trip diversion: CAVH system analyze two types of optimal trip diversion plans though whole system based on current conditions as congestion, incidents, emergency, etc. and user profile including historical trip training and user input.
  1) Historical diversion plan: System select diversion plan based on historical data including alternative optimal routes, recorded driver's driving route, most selected previous diversion plan, etc., in situation such as congestion;
  2) Spontaneous diversion plan: System compute new diversion plans based on current condition including sensing data, event data, prediction plans, etc.

4.6 Emergency management: CAVH system manage three different emergency scenarios as follow:
  1) user emergency method: CAVH system execute user emergency mode when abnormal user behaviors are detected through in-vehicle detectors or user inputs. During the emergency mode system automatically control or guide the vehicle apply basic driving operation such as park to the side and contact necessary parties for further process.
  2) vehicle emergency method: CAVH system execute proactive emergency program when detect significant deviation from 90-95 percentile traveling control characteristics or approaching expected unsafe or unreliable driving conditions according to historical conditions or the prevailing experiences of other CAVH vehicles on the same route. When vehicle encounters such abnormal conditions, it first gives user reaction time to take over the control to ensure safety and system guides user to follow specific emergency treatment plan;
  3) System emergency method: when system failure including lost communication, cyber security issue. Etc., vehicle or user take over the control seamlessly and system finds backup channel to communicate or control the vehicle.

4.7 Trip data and information feedback

In CAVH fixed-route services, the real-time IRIS sensing data is evaluated with safety, mobility, and energy consumption parameters such as observed conflicts and incidents, traffic conditions, and vehicle fuel consumptions. Those real-time performance data is fed back to the CAVH main services to help with system optimization and control optimization in other CAVH trips.

5. Trip Chaining Methods

The methods to generate and manage the plan of trip chaining in a CAVH fixed route trip based on user request or historical trip data. The methods include the following components:

5.1 Trip chain location and route planning method

The method to plan the interim waypoints other than the final destination and/or the detouring paths on the scheduled route to fulfill the users' specific trip purposes based on:
  a) The user profiles including preferred path, locations recurrently visited, driving style, etc.;
  b) The real-time traffic condition including vehicle status, traffic condition, etc.;
  c) User's specific trip demand which may be recurrent or instant.

5.2 Trip Chain Optimization

The method to optimize the sequence of reaching the planned interim waypoints and the corresponding detouring paths before and within a chained trip according to:
  a) the original trip route;
  b) user profile including the trained driving style, preferred path, time/distance/comfortableness sensitivity, etc.;
  c) topologies of the road network, updated real-time traffic condition, etc.;

5.3 Multi-Modal and Clustering Trip Chain Planning Method

The method to plan the locations and approaching routes to change traffic modes, joining/exiting platoon, pick-up/drop-off car-pooling, etc. based on users' preference, the availability of services, and historical recurrent traffic conditions;

6. Privacy Protection 6.1 User data Access and aggregation Level

Leveled encryption/user consent and aggregation methods for fixed route travel data including user profile, travel trajectory and preference etc.
  1) Confidential: Severely protected data which are multiple encrypted or highly aggregated to the outside including user account, travel preference, history travel trajectories etc.
  2) User-consented shared with friends: Severely protected and encrypted data which are open only to friends with user consent including travel plan, travel OD, real time travel position etc.
  3) User-consented shared with public: Privacy protected data which are enciphered, desensitized or aggregated to public under user consent, including user photo, phone number, ridesharing-based ODs etc.
  4) Public route check-in (CAVH system): CAVH system open data which can be shared with public under aggregation and statistics, such as road segment capacity, link travel speed, traffic condition etc.

6.2 Anonymize and reduce the security exposures of origin-destination information (by aggregating location data into zones large enough to make location identification difficult and by randomize user ID or location ID dynamically.

6.3 Randomization/segmentation of trip data shared with CAVH systems or other CAVH driving services to ensure the complete trajectory of a trip cannot be reconstructed from public data. CAVH fixed route travel route protection and anonymization methods to protect travel trajectory information.
  1) Travel route random/fuzzy decomposition such as recording random segments instead of travel route, adding path deviation etc.
  2) CAVH trip/segment randomization using different random user ID, trip ID, road segment ID.

7. Cyber Physical Security Methods

The methods to protect the cyber and physical component of CAVH fixed route system. The cyber security methods comprise of the following components:

7.1 User intervention method

The method to request user intervention to
  a) Physically protect the system by users taking over the control of vehicles and shutting down all CAVH functions except the minimum necessary ones; and
  b) Create a temporary communication isolated environment for the user-vehicle system against any kinds of cyber-attacks;

in cyber-physical emergencies such as the cyber-attacks are detected, or a significant deviation from normal routing or driving plan occurs due to the drastic changes of traffic condition or cyber system failures;

7.2 Trip irregularity detection and mitigation method:

The method to
  a) detect the abnormal deviation of vehicle status and trip trajectories from its profile and trip plan; and
  b) identify the malicious intrusion of the CAVH fixed route system or remote driving control system; and
  c) invoke the user intervention method to protect the system.

7.3 Security exposure risk analysis and mitigation

The method to
  a) detect and analyze the malicious attack or spy attempts, or evaluate the potentials of such malicious attempts; and
  b) identify the risks of cyber/physical exposure which may be more potential to be successful on a fixed recurrent route including:
    a. repeated cyber-attacks towards recurrent route users;
    b. repeated spying to hack some critical information such as recurrent trip pattern, cyber privacy, cyber authentication, etc.;
    c. repeated physical probes to hack some critical information such as recurrent trip pattern, physical privacy (plate number, photo, etc.), etc.;
  c) and mitigate such risks by:
    a. Physical network protection devices such as firewall hardware;
    b. Cyber network protection solutions such as network security software;
    c. Random factor for a fixed recurrent route;
    d. The user intervention method.

8. Human-Machine Interface 8.1. User Input Provision/Feedback Methods: System obtain user's requirement, preference and feedback provided from UI to compute suitable route plan rating, alternative plan notification and selection, CAVH operations services such as platooning, ridesharing and CAVH enter/exiting.

8.2. Driver-Vehicle Handoff: Human can take over control of the vehicle at any time during the trip. When errors are detected, system gives control back to the vehicle and vehicle activates emergency management program, if driver-vehicle handoff delay or failure, system activates emergency parking such as buffer parking, shoulder parking.

8.3. Emergency management interface (link to review and feedback, Claim 6 and Claim 8.3): CAVH system has different types of interaction method with human for emergencies as follows
  1) Voice: System interact with user though voice detection and recognition hardware from OBU or in-vehicle detectors to execute emergency functions remotely or activate emergency programs by user input;
  2) Hot-button: CAVH vehicles require to install hot-button equipment in the vehicle that user can stop the vehicle or activate emergency program immediately by switching on;

3) Body motion detection and interaction: System detect user unusual or unsafe body behavior such as eye closure, hands off the wheel by in vehicle detectors and execute emergency program including steering wheel vibration, light warning etc.;

9. User charging and reward systems 9.1 User charging services: Diversified charging and payment style service offering discount and convenient to the fixed-route CAVH users including Pay-per-user, Pay-per-mile, daily subscription, monthly subscription, more charge more discount etc.

9.2 User payment discounting scenarios: CAVH service payment discounting methods such as more charge more discount, money payback by number of use, discount by membership, discount by sharing data etc.

9.3 User rewarding mechanisms for data input and sharing: Safety, mobility, green ratings, trip integrity etc. data quality-based self-drive and CAV-drive experience data (such as travel route, traffic condition and strategy data etc.) input and sharing rewarding methods for CAVH route planning system optimization, including trip-based rewarding, daily incremental rewarding, specific day rewarding etc. The reward system uses Blockchain to encrypt but also identify the contributions of each data items in overall CAVH services to determine the amount of the rewards.

10. Carpool and Ridesharing—Ride-Platooning 10.1 Route and schedule profile matching: CAVH system optimizes more convenience, economic, suitable route plan by considering user grouping and matching by privacy protection levels, route notification and consent, pickup points, travel time, fuel consumption and emissions, commute and non-commute trips for carpool based on user profile. Then, system recommends dedicated route or specific route with high IRIS occupancy area for safety, mobility, and green driving with the IRIS system.

10.2 Ridesharing service coordination and reservation: CAVH fixed-route car-pooling services that pairs participating users into a single CAVH trip by matching their schedule, route similarity, matching preference. The service also includes trip-day notification and confirmations, and dynamic pickup and dropoff routing to execute the actual ridesharing plans.

10.3 Ride-platooning: CAVH fixed-route vehicle-platooning services that coordinate and establish vehicle platoons with vehicles share similar routes or route segments whose control methods comprises of optimizes route matching including departure and wait time deployment, adhesive schedule control, enroute platooning for similar route vehicles based on historical user profile and onsite coordination including pretrip pairing, notification, and enroute coordination based on user request and current condition.

We claim:

1. A connected and automated vehicle highway (CAVH) fixed-route system comprising computing components,
    wherein said system is configured to:
    a) train and calibrate fixed-route service parameters;
    b) plan and execute trips; or
    c) provide or optimize vehicle navigation, vehicle guidance, or vehicle control before, during, and after CAVH trips;
    wherein said computing components are configured as one of the following:
        a Roadside Intelligent Unit (RSU);
        a Traffic Control Unit/Traffic Control Center (TCU/TCC);
        a CAVH cloud;
        a vehicle.

2. The CAVH fixed-route system of claim 1 further configured to provide cyber-physical security against attacks to the system; or to provide privacy protection for users.

3. The CAVH fixed-route system of claim 1 further comprising a human-machine interface configured to:
    a) receive user input and feedback; or
    b) manage providing vehicle control to a human when system errors are detected.

4. The CAVH fixed-route system of claim 1 wherein said system configured to train and calibrate fixed-route service parameters performs a historical trip profile training method comprising recording trip data, analyzing trip data, sharing trip data, producing a service map, or profiling routes.

5. The CAVH fixed-route system of claim 1 wherein said system configured to train and calibrate fixed-route service parameters performs:
    a) a sensor-based trip data archiving method for characterizing the spatiotemporal environment of a route comprising collecting, archiving, or aggregating trip profile data and manual driving data collected from mobile applications; an onboard unit (OBU), a visual sensor, a gyroscope or an accelerometer; a CAVH road-side units (RSUs) located along routes; or user survey inputs;
    b) a user input trip preference data collection method for customizing fixed-route services prior to a trip comprising collecting user preference data comprising time schedule, driving comfort level, route preference, or detouring preference using a user preference survey, virtual simulator, or other active input technology;
    c) a trip profile sharing and exchange method for optimizing trip execution plans for multiple users having similar behaviors or preferences comprising sharing multiple user routes, multiple user route segments, multiple user origin/destination information, or multiple user arrival/destination times;
    d) a route driving profiling method for designing real-time CAVH trip execution plans comprising evaluating historical driving data to identify user trip characteristics comprising route choice, destination location, parking location, entrance location, driving and control strategy, driving behavior, or driving style;
    e) a route infrastructure profiling method for optimizing and balancing system load comprising using user historical travel profile data and characteristics to identify regular transportation infrastructure, CAVH IRIS infrastructures, and their activation sequences; or
    f) a route safety, mobility, and energy consumption profiling method for supporting vehicle control and driver behavioral distribution analysis comprising collecting link-by-link safety conditions, recurrent traffic conditions, CAVH infrastructure locations, and operating states; and integrating user preference data and user strategic data.

6. The CAVH fixed-route system of claim 5, wherein said system configured to train and calibrate fixed-route service parameters provides calibrated fixed-route service parameters that configure the system to:

1) satisfy user trip preferences; and
2) optimize the safety, mobility, and energy consumption of the CAVH fixed-route services for both trip planning and real-time operations in response to different traffic conditions and trip conditions.

7. The CAVH fixed-route system of claim 1, wherein said system configured to plan and execute trips performs:
   a) pre-trip trip profile planning methods comprising customizing or adjusting primary and alternative routing of trip profiles; departure time; trip chaining; multi-modal transportation; platooning; CAVH entry and exiting; and emergency planning, based on prevailing weather, traffic conditions, recurring congestion or construction events, user activity and scheduling status, and user preference data collected from historical data analytics;
   b) pre-trip trip execution planning methods comprising initializing and customizing detailed CAVH automated driving control instructions comprising turning points, merging points, entry/exiting points, travel speed, lane selection, early/late-merge planning, alternative route execution plans, safety, mobility, and green driving control configurations;
   c) pre-trip notification methods comprising providing trip profile notifications comprising departure time, destination, trip chaining, travel modes, on-schedule warnings, or temporary change of trip profile; or
   d) pre-trip data exchange and feedback methods comprising receiving trip profile data from the CAVH system for planning and notification; and providing data to the CAVH system comprising pre-trip plans and user status for CAVH systems to plan and coordinate related CAVH trips and control resources.

8. The CAVH fixed-route system of claim 1, wherein said system configured to plan and execute trips performs:
   a) enroute dynamic trip management and execution methods for entry into and exit from the CAVH system comprising:
      1) selecting entry and exiting locations for a customized routing plan to maximize safety, reliability, or efficiency;
      2) informing a user or a vehicle that the CAVH system takes control of said vehicle before said vehicle enters a road segment that is controlled by CAVH system;
      3) sending instructions and surrounding information to vehicles; or
      4) informing a user or a vehicle to prepare to take control of said vehicle upon approach of the vehicle to a CAVH system exit;
   b) non-CAVH infrastructure interaction methods comprising:
      1) sharing or pulling information from non-CAVH infrastructure, said information comprising sensing data or traffic signal timing;
      2) computing a real-time vehicle control plan or alternative routing and diversion plan; or
      3) interacting with smart and connected traffic control devices for safety, efficiency, and green vehicle control; or
   c) CAVH infrastructure interaction methods comprising switching between methods for planned interaction scenarios and methods for unplanned interaction scenarios, wherein
      1) said methods for planned interaction scenarios comprise receiving vehicle location or trip route from the CAVH system or vehicles; and planning platooning, ridesharing, or trip optimization; and
      2) said methods for unplanned interaction scenarios comprise computing real-time alternative routes and schedules; communicating with other services or platforms; and sending instructions to vehicles upon reaching an unplanned user incident, vehicle incident, or emergency.

9. The CAVH fixed-route system of claim 1, wherein said system configured to plan and execute trips performs driving task methods during a trip comprising
   a) navigation methods comprising adjusting or planning a route based on traffic, safety, or user preferences;
   b) guidance methods comprising generating instructions for car or road following, merging or diverging, or passing based on CAVH user profile, facility map, unexpected hazards, or the physical environment; or
   c) control methods comprising providing coordinated or remote control of vehicles by the CAVH system at specified road segments.

10. The CAVH fixed-route system of claim 1, wherein said system configured to plan and execute trips performs trip diversion methods comprising:
    a) analyzing current conditions comprising congestion, incidents, or emergency and evaluating a user profile comprising historical trip training and user input; and
    b) diverting a vehicle using a historical diversion plan based on historical data comprising alternative optimal routes, a recorded driving route, or recently selected diversion plan; or a spontaneous diversion plan based on current conditions comprising sensing data, event data, or prediction plans.

11. The CAVH fixed-route system of claim 1 configured to manage emergencies by performing:
    a) a user emergency method comprising detecting abnormal user behaviors; automatically controlling or guiding a vehicle; and contacting necessary parties for further process;
    b) a vehicle emergency method comprising detecting a deviation from 90-95 percentile traveling control characteristics or approaching unsafe or unreliable driving conditions; and guiding a user to control the vehicle according to a specific emergency treatment plan; or
    c) a system emergency method comprising detecting communication errors or a cyber security issue; providing control of a vehicle to a user or to said vehicle; and identifying a backup channel for the system to communicate with or control the vehicle.

12. The CAVH fixed-route system of claim 1 wherein said system configured to provide or optimize vehicle navigation, vehicle guidance, or vehicle control before, during, and after CAVH trips performs trip data and information feedback methods comprising evaluating real-time sensing data relative to safety, mobility, and energy consumption parameters; and using the real-time sensing data to contribute to system optimization and optimization of CAVH trips.

13. The CAVH fixed-route system of claim 1, wherein said system configured to plan and execute trips performs trip chaining methods comprising:
    a) generating and managing a trip chaining plan based on user requests and historical trip data; or
    b) planning interim waypoints or detouring paths on a route using data comprising a preferred path, location recurrently visited, driving style, a recurrent or one-time trip demand, vehicle status, or real-time traffic condition.

14. The CAVH fixed-route system of claim 13, wherein said trip chaining methods further comprise optimizing the sequence of said interim waypoints or detouring paths before and within a chained trip according to the original trip route, user profile data, road network topology, and real-time traffic conditions.

15. The CAVH fixed-route system of claim 13, wherein said trip chaining methods further comprise planning locations or routes for changing traffic modes; joining or exiting a platoon; or picking up or dropping off a carpool passenger according to user preferences, service availability, and historical recurrent traffic conditions.

16. The CAVH fixed-route system of claim 2, wherein said system configured to provide privacy protection performs a method comprising:
   a) categorizing user data as a level that is confidential; user-consented shared with friends; user-consented shared with public; or public according to encryption, user consent, and aggregation levels; and
   b) encrypting or restricting access to said user data according to the level of said user data, wherein:
   1) confidential data is multiply encrypted and access to confidential data is restricted to the user and CAVH system;
   2) user-consented shared with friends data is encrypted and access to user-consented shared with friends data is restricted to the user, user friends having user consent, and CAVH system;
   3) user-consented shared with public data is enciphered, desensitized, or aggregated and access to said enciphered, desensitized, or aggregated data is provided to the user, CAVH system, and the public; or
   4) public data is aggregated or used to calculated statistical data and the aggregate or statistical data is provide to the user, CAVH system, and the public.

17. The CAVH fixed-route system of claim 2, wherein said system configured to provide privacy protection performs a method comprising:
   a) anonymizing origin-destination information;
   b) aggregating location data into zones large enough to make location identification difficult; or
   c) randomizing user ID or location ID dynamically.

18. The CAVH fixed-route system of claim 2, wherein said system configured to provide privacy protection performs a method comprising:
   a) randomizing or segmenting trip data shared with CAVH systems or other CAVH driving services to ensure the complete trajectory of a trip cannot be reconstructed from public data;
   b) anonymizing travel trajectory information;
   c) recording decomposed travel routes as random or fuzzy segments; or
   d) randomizing CAVH trips or segments using different random user ID, trip ID, or road segment ID.

19. The CAVH fixed-route system of claim 2, wherein said system configured to provide cyber-physical security protects the cyber and physical components of said CAVH fixed-route system by performing:
   a) a user intervention method comprising:
   1) detecting a cyber-physical emergency, a significant deviation from normal routing or driving plan, or drastic changes of traffic condition or cyber system failures; and
   2) requesting users to control vehicles and shutting down CAVH functions except the minimally necessary CAVH functions; or
   3) creating a temporary environment for user-vehicle communication isolated against cyber-attacks; or
   b) a trip irregularity detection and mitigation method comprising:
   1) detecting a deviation of vehicle status or vehicle trajectory from its profile and trip plan;
   2) identifying a malicious intrusion into the CAVH fixed route system or remote driving control system; or
   3) requesting users to control vehicles and shutting down CAVH functions except the minimally necessary CAVH functions.

20. The CAVH fixed-route system of claim 1 configured to provide security exposure risk analysis and mitigation by performing a method comprising:
   a) predicting or detecting a malicious attack or spy attempt; and
   b) identifying the risks of cyber or physical exposure on a fixed recurrent route; or
   c) mitigating risks of cyber or physical exposure by providing physical network protection, cyber network protection, randomization of a fixed recurrent route, or requesting user intervention.

21. The CAVH fixed-route system of claim 1 configured to provide an emergency management interface configured to:
   a) interact with a user using voice detection and recognition hardware to execute emergency functions remotely or activate emergency programs;
   b) provide a hot-button for a user to stop the vehicle or activate an emergency program; or
   c) detect unusual or unsafe user body behavior.

22. The CAVH fixed-route system of claim 1 configured to provide:
   a) user charging services;
   b) user payment discounting services; or
   c) user reward mechanisms for data input and sharing.

23. The CAVH fixed-route system of claim 1 configured to provide:
   a) route and schedule profile matching
   b) ridesharing service coordination and reservation; or
   c) ride-platooning.

* * * * *